(12) United States Patent
Kasama

(10) Patent No.: US 8,905,941 B2
(45) Date of Patent: Dec. 9, 2014

(54) GUIDANCE METHOD, APPARATUS THEREOF, RECORDING MEDIUM STORING PROGRAM THEREOF, AND DEVICE

(75) Inventor: Koichiro Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1409 days.

(21) Appl. No.: 12/390,723

(22) Filed: Feb. 23, 2009

(65) Prior Publication Data

US 2009/0312654 A1    Dec. 17, 2009

(30) Foreign Application Priority Data

Jun. 12, 2008  (JP) ................................. 2008-154459

(51) Int. Cl.
  *G06F 3/042*  (2006.01)
  *G10H 1/36*  (2006.01)
  *A61B 5/02*  (2006.01)

(52) U.S. Cl.
  CPC ..................................... *G06F 3/042* (2013.01)
  USPC ........... 600/500; 84/634; 178/18.09; 345/175

(58) Field of Classification Search
  None
  See application file for complete search history.

(56) References Cited

U.S. PATENT DOCUMENTS 6,162,185 A    12/2000  Amano et al.
6,252,153 B1 *  6/2001  Toyama ........................ 84/634

FOREIGN PATENT DOCUMENTS

| JP | 10-155754 | 6/1998 |
| JP | 2003-330523 | 11/2003 |
| JP | 2007-244600 | 9/2007 |
| JP | 2007-251415 | 9/2007 |
| JP | 2007-284049 | 11/2007 |
| JP | 2008-54890 | 3/2008 |

OTHER PUBLICATIONS

Japanese Office Action issued Sep. 25, 2012 in corresponding Japanese Patent Application No. 2008-154459.

* cited by examiner

*Primary Examiner* — Benjamin P Blumel
(74) *Attorney, Agent, or Firm* — Staas & Halsey LLP

(57) ABSTRACT

A first evaluation mode and a second evaluation mode for evaluating with a criterion different from the first evaluation mode are set and the second evaluation mode is applied to acquired information before application of the first evaluation mode to output the evaluation result. A user recognizes that the evaluation result is acquired from the current finger placement. If a change is made in the evaluation result by making transition from the second evaluation mode to the first evaluation mode, the user sensuously recognizes again that the finger placement is not proper from the evaluation result and is prompted to perform a correct operation of the finger position.

14 Claims, 37 Drawing Sheets

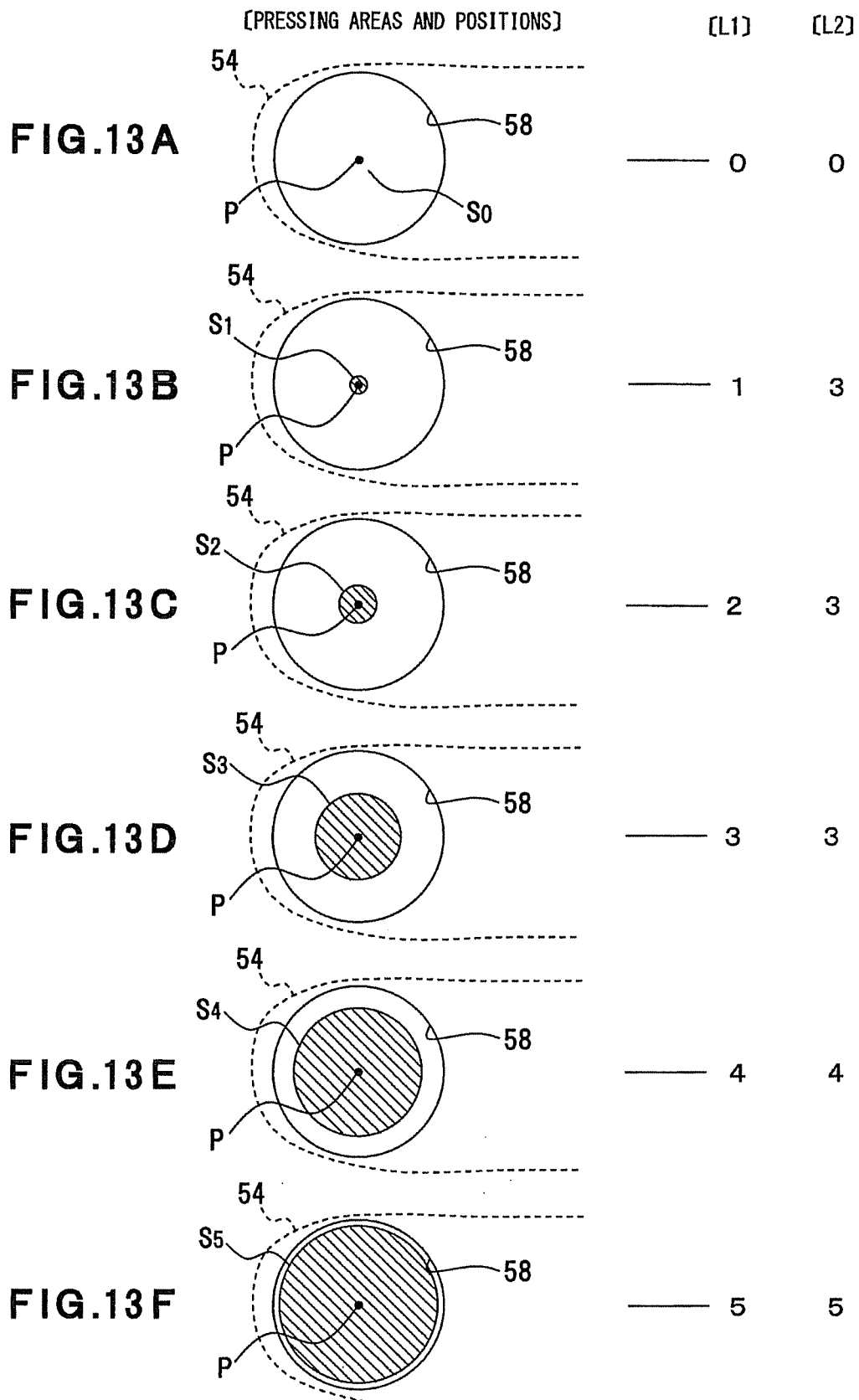

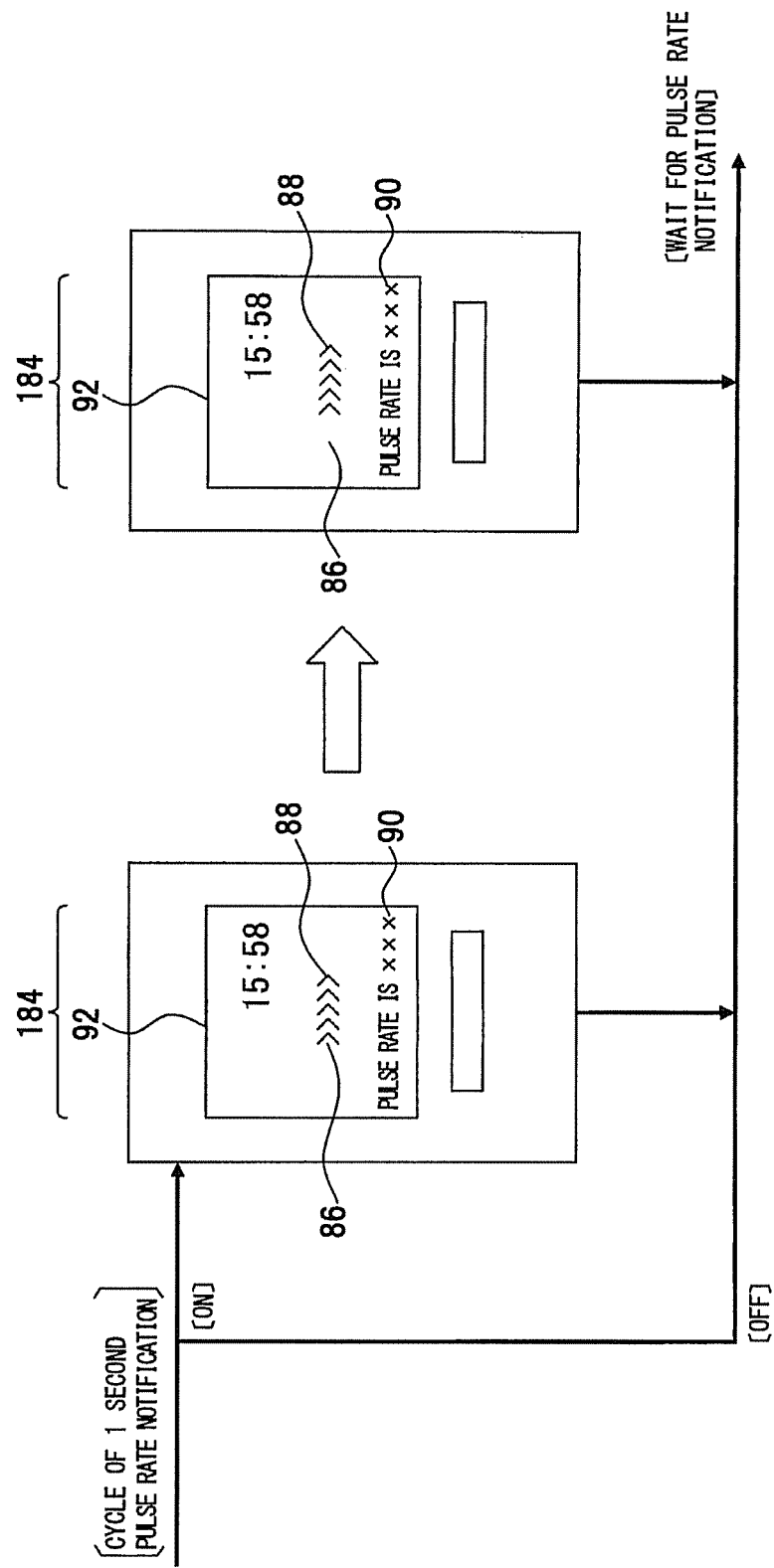

FIG.31

| PULSE AMPLITUDE INFORMATION | LEVEL GAUGE ||
|---|---|---|
| | [L1] | [L3] |
| AMPLITUDE=0 (NONE) | 0 | 0 |
| AMPLITUDE=1 (VERY SMALL) | 1 | 0 |
| AMPLITUDE=2 (SMALL) | 2 | 0 |
| AMPLITUDE=3 (INTERMEDIATE) | 3 | 3 |
| AMPLITUDE=4 (LARGE) | 4 | 4 |
| AMPLITUDE=5 (VERY LARGE) | 5 | 5 |

GUIDANCE METHOD, APPARATUS THEREOF, RECORDING MEDIUM STORING PROGRAM THEREOF, AND DEVICE

CROSS-REFERENCE TO RELATED APPLICATIONS

This application is based upon and claims the benefit of priority from the prior Japanese Patent Application No. 2008-154459, filed on Jun. 12, 2008, the entire contents of which are incorporated herein by reference.

FIELD

This embodiments relate to guidance of a device having an evaluation function for evaluating information acquired from a living body such as a finger and, more particularly, to a guidance method, an apparatus thereof, a recording medium storing the program, and a device, which include evaluating an acquisition state of image information acquired from a finger such as a position of a finger when acquiring pulse amplitude from image information of a finger to prompt a user for corrective operation based on the evaluation result.

BACKGROUND

It is conventionally known to pick up pulses (pulse amplitude) from image information acquired from a finger. This image information is acquired by taking an image of a finger using transmitted light such as near-infrared light. An image must be taken while a finger is maintained in a correct state to acquire correct image information.

With regard to picking up of pulses, Japanese Patent Application Laid-Open Publication No. 2007-244600 discloses including a pressurizing member to which a finger tip is pressed as well as a finger tip position stabilizing means which stably holds the position of the finger tip pressed to the pressurizing member and a finger pressure equalizing means which makes the pressurizing member freely movable with nearly equal finger pressure to stably hold the position of the finger tip and equalize a pressurizing force applied from the pressurizing member to the finger tip so as to prevent the photographing range of the finger tip and blood flow from being affected, so that the pulse wave is collected stably (Abstract, FIG. 1, etc.).

Japanese Patent Application Laid-Open Publication No. 10-155754 discloses detecting pressing of a finger with a pressure sensor; obtaining a DC component of the detected output, which is stored into a calibration table in correspondence to a pressure level; calculating a threshold as reference in the grading of sensation based on the maximum value of the pressure level and the calibration table, which is stored into a threshold table; detecting a blood stream of a finger when holding an object; and obtaining a DC component of the detected output, which is compared with the threshold in the threshold table to display sensation information indicative of the degree of the pressing (Abstract, FIG. 5, etc.).

SUMMARY

An aspect of the embodiments of the present invention provides a guidance method of giving guidance through evaluation results for acquired information, including outputting an evaluation result by applying a second evaluation mode before application of a first evaluation mode, the first evaluation mode for evaluating the acquired information with a first stepwise criterion and the second evaluation mode for evaluating the acquired information with a second criterion different from the first evaluation mode being set; and outputting an evaluation result by making transition to the first evaluation mode after the application of the second evaluation mode.

With such a structure, since the evaluation is performed with different criteria in the first and second evaluation modes, if the second evaluation mode is applied to the acquired information before application of the first evaluation mode and the transition is then made to the first evaluation mode, different evaluation results may be obtained. For example, in the case of acquiring image information from a finger, if transition is made to the first evaluation mode from a evaluation result acquired by applying the second evaluation mode to the acquired information, the evaluation result is acquired from the evaluation based on the criterion of the first evaluation mode, and if a change is made in the evaluation result, a user is prompted to perform a correction operation for the finger placement. As a result, the user may learn and become familiarized with the finger placement corresponding to the evaluation result.

In the guidance method, preferably, the transition from the second evaluation mode to the first evaluation mode may be configured to be made after a predetermined time elapses from a start of the second evaluation mode. With such a structure, since the transition is made from the second evaluation mode to the first evaluation mode after waiting for a predetermined time, the guidance may be given by the change in the evaluation result to prompt the user to correct the finger placement, etc., based on the acquired information.

An aspect of the embodiments of the present invention provides a guidance apparatus giving guidance through evaluation results for acquired information, including an information acquiring part that acquires information; and a control part that outputs an evaluation result by applying a second evaluation mode before application of a first evaluation mode, the first evaluation mode for evaluating acquired information of the information acquiring part with a first stepwise criterion and the second evaluation mode for evaluating the acquired information with a second criterion different from the first evaluation mode being set, and that outputs an evaluation result of the first evaluation mode by making transition to the first evaluation mode from the application of the second evaluation mode.

An aspect of the embodiments of the present invention provides a computer readable recording medium having stored thereon a guidance program operable to drive a computer to execute a process of giving guidance through evaluation results for acquired information, the program including outputting an evaluation result by applying a second evaluation mode before application of a first evaluation mode, the first evaluation mode for evaluating the acquired information with a first stepwise criterion and the second evaluation mode for evaluating the acquired information with a second criterion different from the first evaluation mode being set; and outputting an evaluation result by making transition to the first evaluation mode from the application of the second evaluation mode.

An aspect of the embodiments of the present invention provides a device having guidance function giving guidance through evaluation results for acquired information, including an information acquiring part that acquires information; and a control part that outputs an evaluation result by applying a second evaluation mode before application of a first evaluation mode, the first evaluation mode for evaluating acquired information of the information acquiring part with a first stepwise criterion and the second evaluation mode for evaluating the acquired information with a second criterion different from the first evaluation mode being set, and that outputs an evaluation result of the first evaluation mode by making transition to the first evaluation mode from the application of the second evaluation mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Features and advantages of the embodiments of the present invention will become more apparent by reference to the accompanying drawings and the embodiments.

BRIEF DESCRIPTION OF DRAWINGS

FIGS. 13A to 13F are diagrams of pressing areas and positions of a finger tip on the camera unit and image levels;
FIG. 20 is a diagram of the level gauge display and the pulse display of a sub-displaying unit;
FIG. 31 is a level gauge guidance table according to a third embodiment.

DESCRIPTION OF EMBODIMENTS

According to an aspect of the embodiments of the present invention, a first evaluation mode is set for evaluating acquired information such as finger image information with a stepwise criterion along with a second evaluation mode for evaluating the acquired information with a criterion different from the first evaluation mode. The second evaluation mode is applied to the acquired information before application of the first evaluation mode to output the evaluation result. A user recognizes that the evaluation result is acquired from the current finger placement. When the first evaluation mode is applied after time elapses from the second evaluation mode, the evaluation result in the first evaluation mode is acquired. If a change is made in the evaluation result by making the transition from the second evaluation mode to the first evaluation mode, the user sensuously recognizes again that the finger placement is not proper from the evaluation result and is prompted to perform a correct operation of the finger position. Therefore, the user learns and becomes familiarized with the appropriate finger placement. If no change is made in the evaluation result by making the transition from the second evaluation mode to the first evaluation mode in this case, the finger placement is appropriate from the beginning.

[a] First Embodiment

Figure 1:
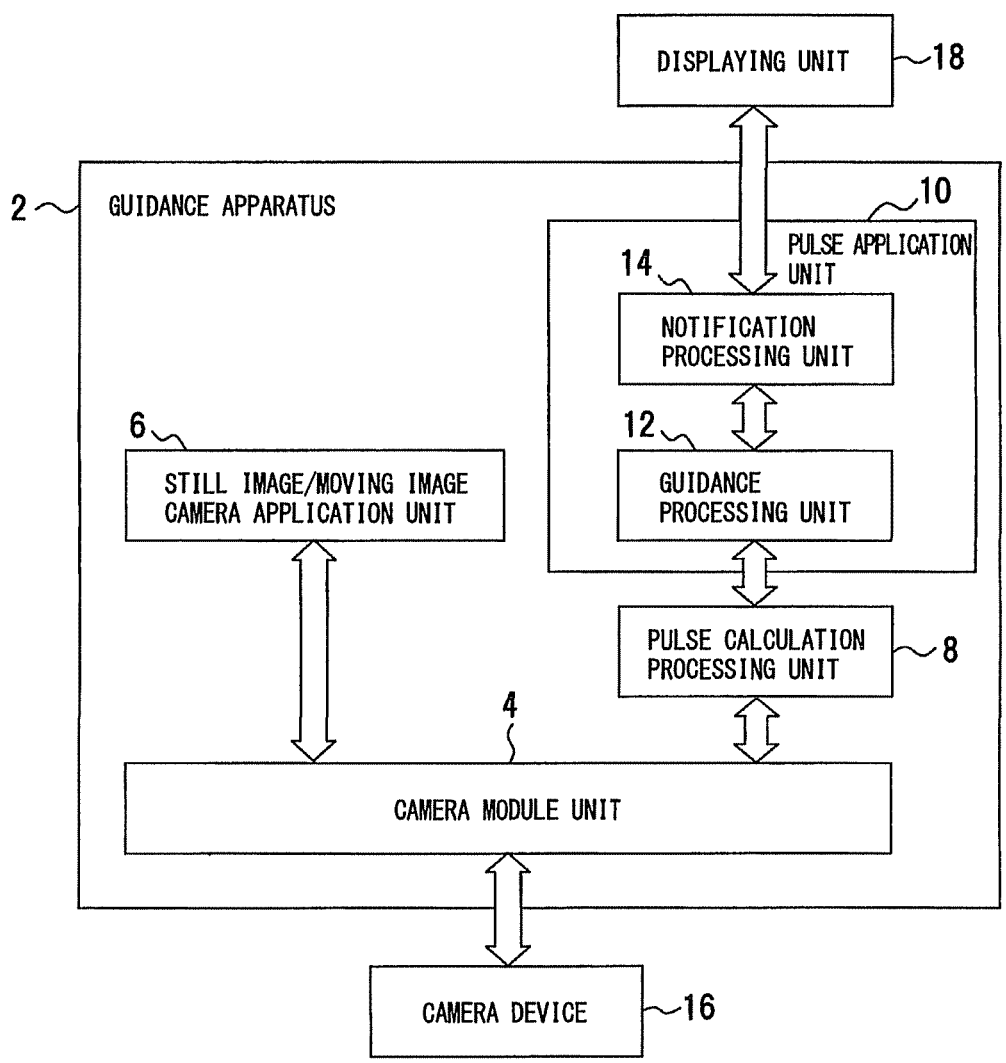
FIG. 1 is a diagram of a guidance apparatus according to a first embodiment.
Figure 2:
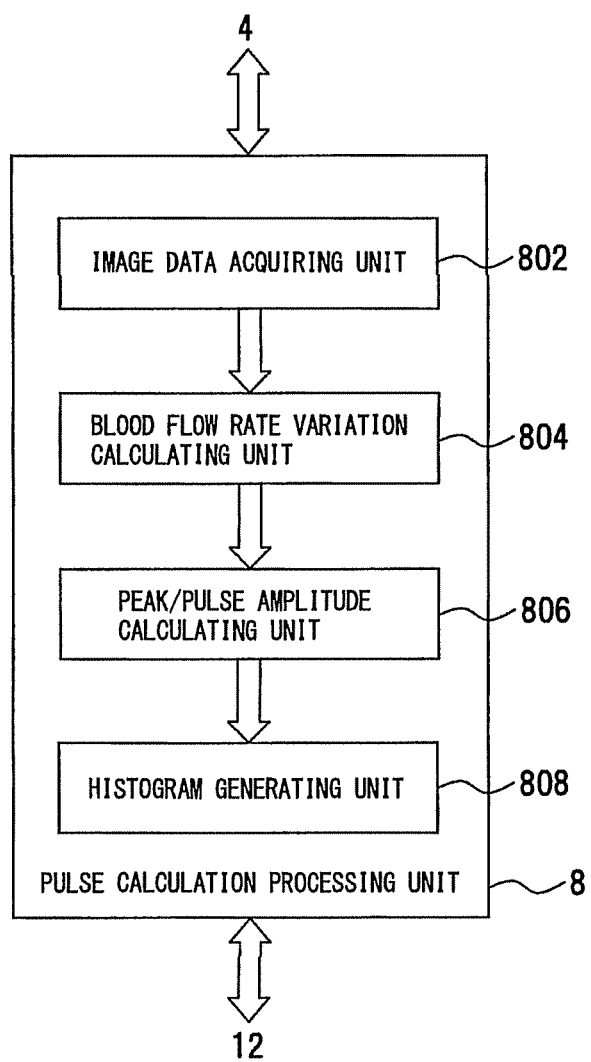
FIG. 2 is a diagram of a pulse calculation processing unit.

A first embodiment will be described with reference to FIGS. 1 and 2. FIG. 1 depicts a guidance apparatus according to the first embodiment and FIG. 2 depicts a pulse calculation processing unit. The configurations of FIGS. 1 and 2 are by way of example and the present invention is not limited to these configurations.

A guidance apparatus 2 is a guidance means (part) that guides the placement of a finger based on an evaluation result of acquired image when a pulse (pulse amplitude) is picked up from image information of a finger and, specifically, is provided with a device such as a camera having a function of taking an image to take an image of transmitted light such as near-infrared light transmitted through a finger and evaluates information acquired from the finger to guide the position and the pressing of the finger to the appropriate position and pressing state by the evaluation result when the pulse (pulse amplitude) is picked up from the image information. Therefore, the guidance apparatus 2 includes a camera module unit 4, a still image/moving image camera application unit 6, a pulse calculation processing unit 8, and a pulse application unit 10 as depicted in FIG. 1, and the functions and the process details of the function units are as follows.

The camera module unit 4 is a means (part) of controlling the camera device 16, which is a finger image taking means (part), to a predetermined operation mode to acquire image information from the camera device 16 and executes the control of the camera device 16, the acquisition of the image information, etc. When controlling the camera device 16, the camera module unit 4 receives a camera activation mode request from the still image/moving image camera application unit 6 or a notification processing unit 14 of the pulse application unit 10 and drives the camera device 16 to operate in accordance with camera settings preset for each mode. When the image information is acquired, the camera module unit 4 acquires the image information from the camera device 16 and provides the image information to the pulse calculation processing unit 8 or the still image/moving image camera application unit 6. The camera settings are a frame rate, auto white balance, auto luminance adjustment, a data acquisition format, etc. For example, in the case of a pulse measurement mode, the image information acquired from the camera device 16 is acquired as image data in the YUV format with 12 fps (frame per second), AWB (auto white balance): OFF, and AE (auto exposure): ON, and the image data are delivered to the pulse calculation processing unit 8 or the still image/moving image camera application unit 6. Fps is an index representative of smoothness of moving images and represents the number of images per minute, and 12 fps indicates that the number of images per minute is 12. AWB represents color tone correction, and AWB: OFF represents no color tone correction. AE is auto exposure and, in YUV, Y is a luminance signal; U is a difference between the luminance signal Y and a color difference component; and V is a difference between the luminance signal Y and a red color component.

The still image/moving image camera application unit 6 is a means that gives notification of a camera operation mode and receives the image information, and performs the camera operation mode notification and the image information acquisition. When giving notification of a camera operation mode and receiving the image information, the still image/moving image camera application unit 6 notifies the camera module unit 4 of whether a camera operation mode is a still image mode or a moving image mode, etc., and receives image information acquired by the camera module unit 4 with the camera setting in accordance with the mode.

The pulse calculation processing unit 8 is a pulse calculating means that calculates the pulse from finger image information, includes an image data acquiring unit 802, a blood flow rate variation calculating unit 804, a peak/pulse amplitude calculating unit 806, and a histogram generating unit 808 as depicted in FIG. 2, and calculates the number of pulses through processes such as picking up of blood flow information from the image information, calculation of pulse information from the blood flow information, and acquisition of the finger image information.

The image data acquiring unit 802 is a means (part) of acquiring the finger image information, is notified of a camera operation mode by the camera module unit 4 in the pulse measurement mode supplied from a guidance processing unit 12 of the pulse application unit 10, and receives the image data acquired by the camera module unit 4 with camera setting in accordance with the set mode.

The blood flow rate variation calculating unit 804 is a means (part) of acquiring the blood flow information from the image information, considers as a blood flow rate, for example, the luminance information (Y-information) of the YUV-format image data acquired as the image information, calculates variations of the blood flow rate from variations in the Y-information at 12 fps from the camera module unit 4, and retains the variation information representative of the blood flow rate. A plurality of different threshold values $B_{ref1}$, $B_{ref2}$, and $B_{ref3}$ ($B_{ref1} < B_{ref2} < B_{ref3}$) are set as stepwise reference values of evaluating luminance for the luminance of the Y-information and it is determine that "it's dark" in the case of the threshold value $B_{ref1}$ or less, "it's bright" in the case of the threshold value $B_{ref2}$ or more, and "no finger is placed" in the case of the greater threshold value $B_{ref3}$ or more to give notification of the image state.

Since irradiation light applied to a living body is generally absorbed by hemoglobin in blood, the luminance of light transmitted through a living body such as a finger and a blood flow rate have a relationship such that the luminance is reduced if the blood rate of the living body is high and is not reduced if the blood rate of the living body is low. As a result, variations in the blood flow rate show up as the luminance of the transmitted light and, therefore, the blood flow rate variations may be calculated from the luminance information (blood flow information).

The peak/pulse amplitude calculating unit 806 is a calculating means (part) that calculates pulse information from blood flow information, calculates the maximum values and the minimum values from the calculated blood flow rate variations, considers the maximum values as throbbing (peaks) of pulses, and calculates the peak/pulse amplitude as the pulse information.

The histogram generating unit 808 is a calculation processing means (part) that calculates the number of pulses from the pulse information and uses the calculated peak (/pulse amplitude) to generate a histogram (FIG. 15) of peak interval (time) in a certain time period (e.g., time period up to about 20 seconds). Peak intervals having probabilities equal to or less than a certain probability are removed from the histogram to calculate the number of pulses per unit time, for example, one minute, from the sample of the peak intervals.

The pulse application unit 10 (FIG. 1) is a processing means (part) of generating guidance output based on the image information received from the pulse calculation processing unit 8 to give notification of the guidance output and includes the above described guidance processing unit 12 and notification processing unit 14.

The guidance processing unit 12 is a guidance generating means (part) that generates the guidance output based on the image information and performs acquisition of an image state, determination of guidance contents, determination of a level gauge value, reception of the image information, etc.

Figure 16:
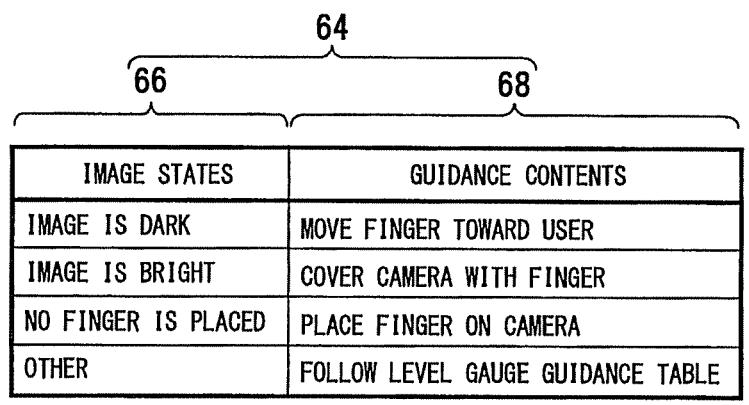
FIG. 16 is a diagram of an exemplary configuration of a guidance table.

When acquiring the image state, the guidance processing unit 12 acquires pulse amplitude information and an image state notified from the pulse calculation processing unit 8 as information for determining the guidance contents. When determining the guidance contents, the guidance processing unit 12 determines the guidance contents for acquiring the appropriate image state from the image state acquired from the pulse calculation processing unit 8 with reference to a guidance table (FIG. 16).

Figure 17:
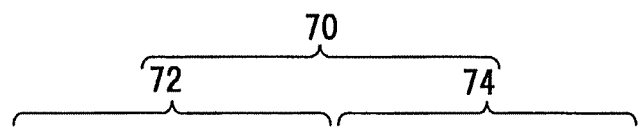
FIG. 17 is a diagram of an exemplary configuration of a level gauge guidance table.

When determining a level gauge value, if the pulse amplitude information is acquired from the image information, a reference is made from the guidance table (FIG. 16) to a level gauge guidance table (FIG. 17). This guidance table gives guidance through a level gauge for the finger placement relative to an in-camera unit 24 (FIG. 3) or an out-camera unit 26 (FIG. 3) and modes for evaluating the finger placement are set as a hard mode, which is a first evaluation mode, and an easy mode, which is a second evaluation mode. The hard mode and the easy mode are set to represent difficulties of evaluation levels; the hard mode (first evaluation mode) is a standard mode for strictly judging the finger placement; and the easy mode (second evaluation mode) is an extra mode for making users familiarized with the finger placement by giving a higher evaluation even if the finger placement is poor.

A first level gauge value $L_1$ and a second level gauge value $L_2$ are set for the hard mode and the easy mode, respectively; the level gauge value $L_1$ is a first stepwise reference level and is a standard value; and the level gauge value $L_2$ is a second reference level and is set to a value different from the level gauge value $L_1$.

The easy level gauge value $L_2$ is used from the start of usage for a predetermined time period, for example, one minute in the level gauge guidance of this case and is shifted to the hard level gauge value $L_1$ after one minute passes. The second evaluation mode is used before the first evaluation mode and the first evaluation mode is applied after a predetermined time period to prompt a user to correct the finger placement and to notify that the current finger placement is appropriate.

When receiving the image information, the guidance processing unit 12 notifies the camera module unit 4 of a camera operation mode and receives image data acquired by the camera module unit 4 with the camera setting in accordance with the operation mode.

The notification processing unit 14 is a means (part) of giving notification of process contents and receiving image information and performs a notification process and the reception of image information. In the notification process, the notification processing unit 14 notifies a user of the guidance contents or the level gauge value supplied from the guidance processing unit 12. The guidance contents are implemented by level gauge data display, message display, or sounds, and the level gauge value is displayed by gauge display or a numeric value. The level gauge data display, the message display, the gauge display or a numeric value is displayed on a displaying unit 18, which is a guidance displaying means (part).

When receiving the image information, the notification processing unit 14 notifies the camera module unit 4 of a camera operation mode and receives image data acquired by the camera module unit 4 with the camera setting in accordance with the mode. In this case, the image data are acquired through the guidance processing unit 12.

Figure 3:
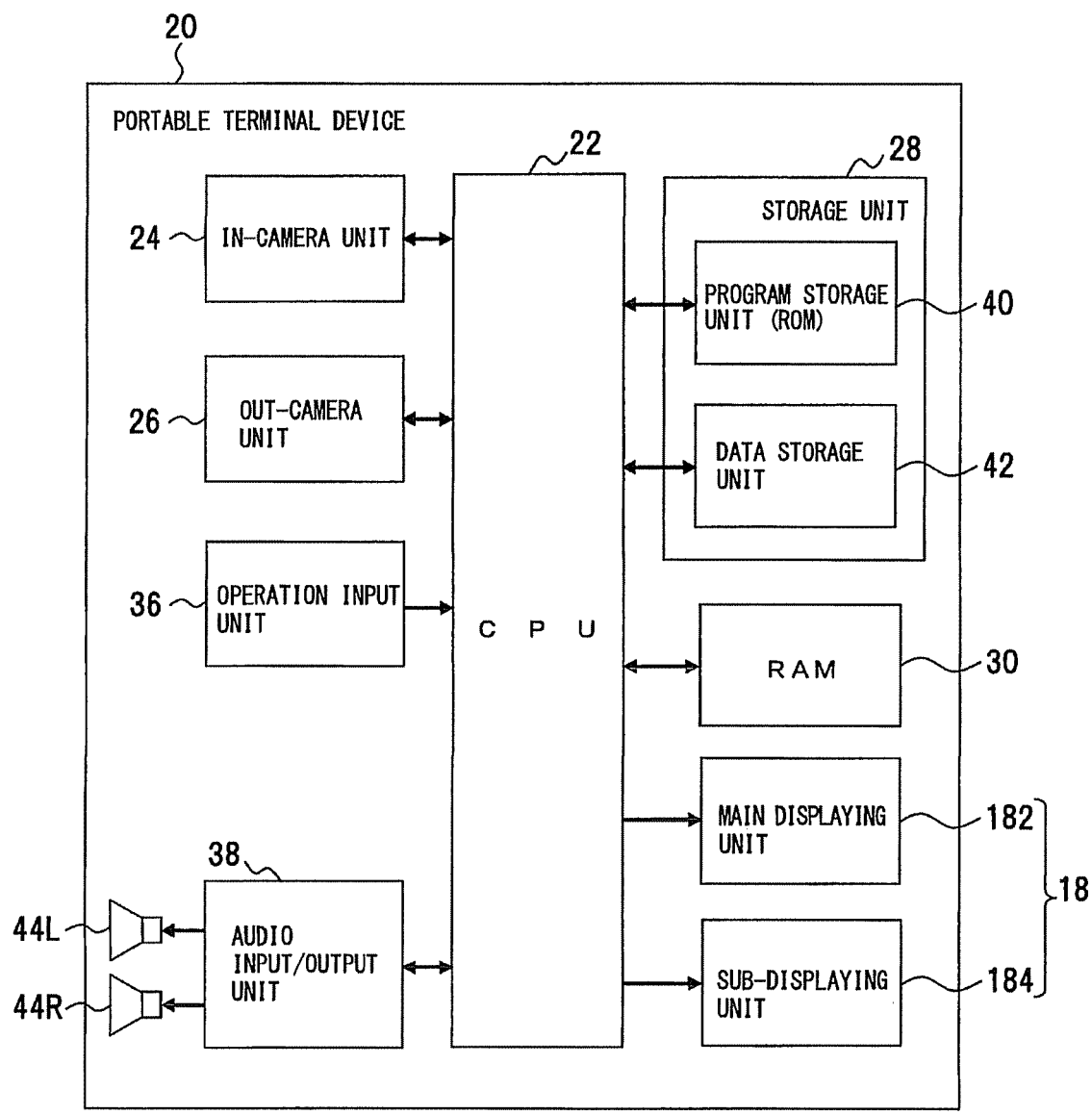
FIG. 3 is a diagram of a hardware configuration of a portable terminal apparatus.
Figure 4:
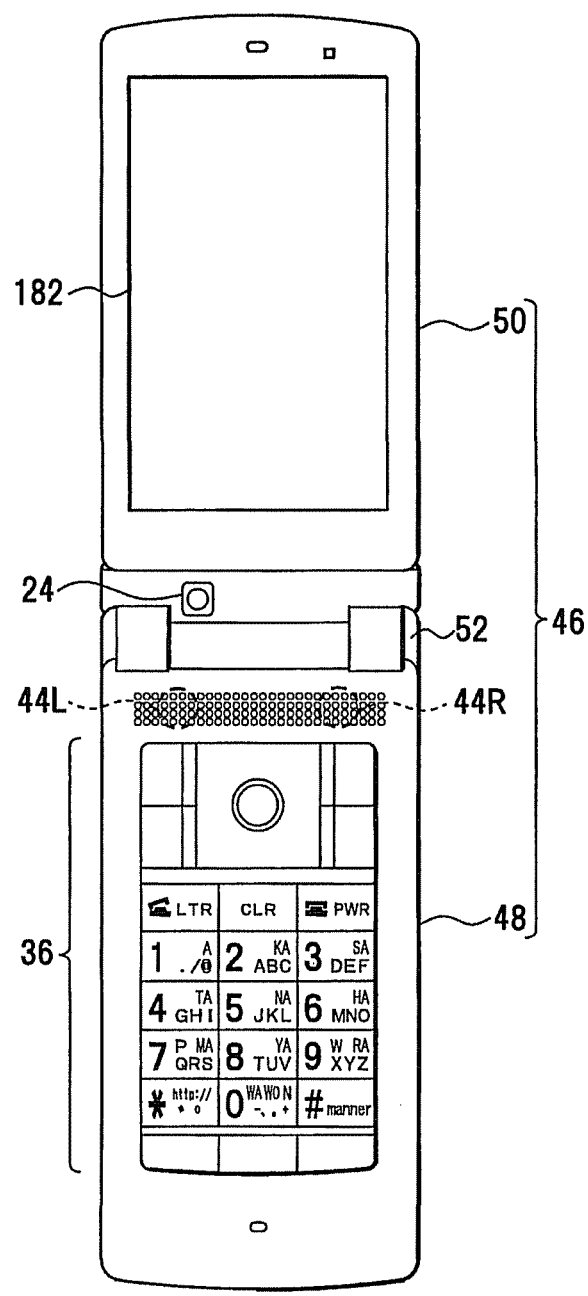
FIG. 4 is a diagram of an exterior configuration when the portable terminal apparatus is opened.
Figure 5:
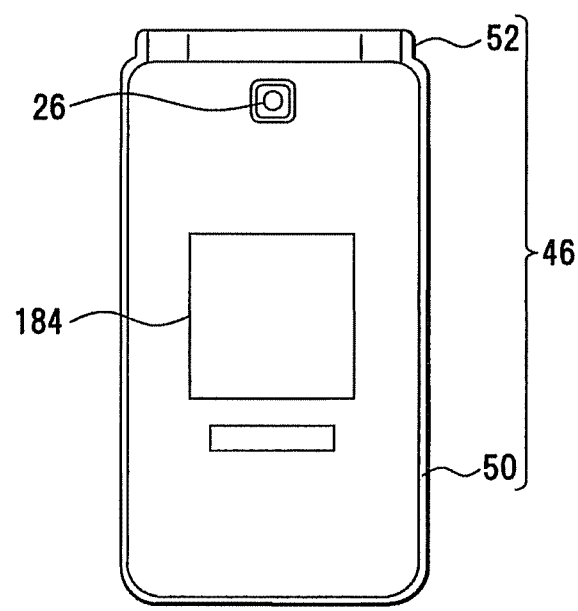
FIG. 5 is a diagram of an exterior configuration when the portable terminal apparatus is closed.

A portable device provided with the guidance apparatus will then be described with reference to FIGS. 3 to 5. FIG. 3 depicts a hardware configuration of a portable terminal apparatus; FIG. 4 depicts an exterior configuration when the portable terminal apparatus is opened; and FIG. 5 depicts an exterior configuration when the portable terminal apparatus is closed. The configurations of FIGS. 3 to 5 are by way of example and the present invention is not limited to these configurations.

A portable terminal device 20 is an exemplary device provided with the guidance apparatus 2 and has a telephone function, an image taking function, and an information processing function. The portable terminal device 20 includes a CPU (central processing unit) 22, the in-camera unit 24, the out-camera unit 26, a storage unit 28, a RAM (random access memory) 30, a main displaying unit 182, a sub-displaying unit 184, an operation input unit 36, and an audio input/output unit 38, as depicted in FIG. 3.

The CPU 22 executes various programs such as OS (operating system) and a guidance program in the storage unit 28 and controls the image taking, the guide output, etc. The in-camera unit 24 and the out-camera unit 26 are examples of an image taking means (part), have a normal image taking function, and make up a means (part) of acquiring finger image information.

The storage unit 28 is an example of a recoding means (part) that stores programs and taken image data, is made up of a recording medium, for example, a flash memory, and includes a program storage unit 40 and a data storage unit 42. The program storage unit 40 has stored thereon the above described OS, the guidance program, etc., and the data storage unit 42 has various data stored thereon and includes the guidance table (FIG. 16) and the level gauge guidance table (FIG. 17) described later.

The main displaying unit 182 and the sub-displaying unit 184 are examples of the above described displaying unit 18, which is the guidance displaying means, are made up of, for example, LCD (liquid crystal display) devices, and are used for the level gauge display, and the main displaying unit 182 and the sub-displaying unit 184 are selectively or concurrently used.

The operation input unit 36 is an example of an input means (part), includes, for example, character keys and cursor keys, and used for entering setting, switching display, etc. The audio input/output unit 38 is an example of an audio input/output means (part), is used for input/output of phone-call voice, includes, for example, speakers 44L and 44R, is used for output of the guidance sound, which is an example of the guidance display.

The portable terminal device 20 includes a foldable housing 46 as depicted in FIGS. 4 and 5, and the housing 46 is formed in an openable/closable manner by linking a fixed housing unit 48 that is a first housing unit and a movable housing unit 50 that is a second housing unit with a hinge unit 52.

The fixed housing unit 48 is disposed with the operation input unit 36 and the speakers 44L and 44R; the movable housing unit 50 is disposed with the in-camera unit 24 and the main displaying unit 182; and the back surface of the movable housing unit 50 is disposed with the out-camera unit 26 and the sub-displaying unit 184.

In this embodiment, the positions of the in-camera unit 24 and the out-camera unit 26 are by way of example and may be any positions on the housing 46 or a camera dedicated to the finger pulse detection may be disposed.

The placement of a finger on the camera will then be described with reference to FIGS. 6 to 9. FIGS. 6 to 9 depict examples of the placement of a finger. The configurations of FIGS. 6 to 9 are by way of example and the present invention is not limited to these configurations.

Figure 6:
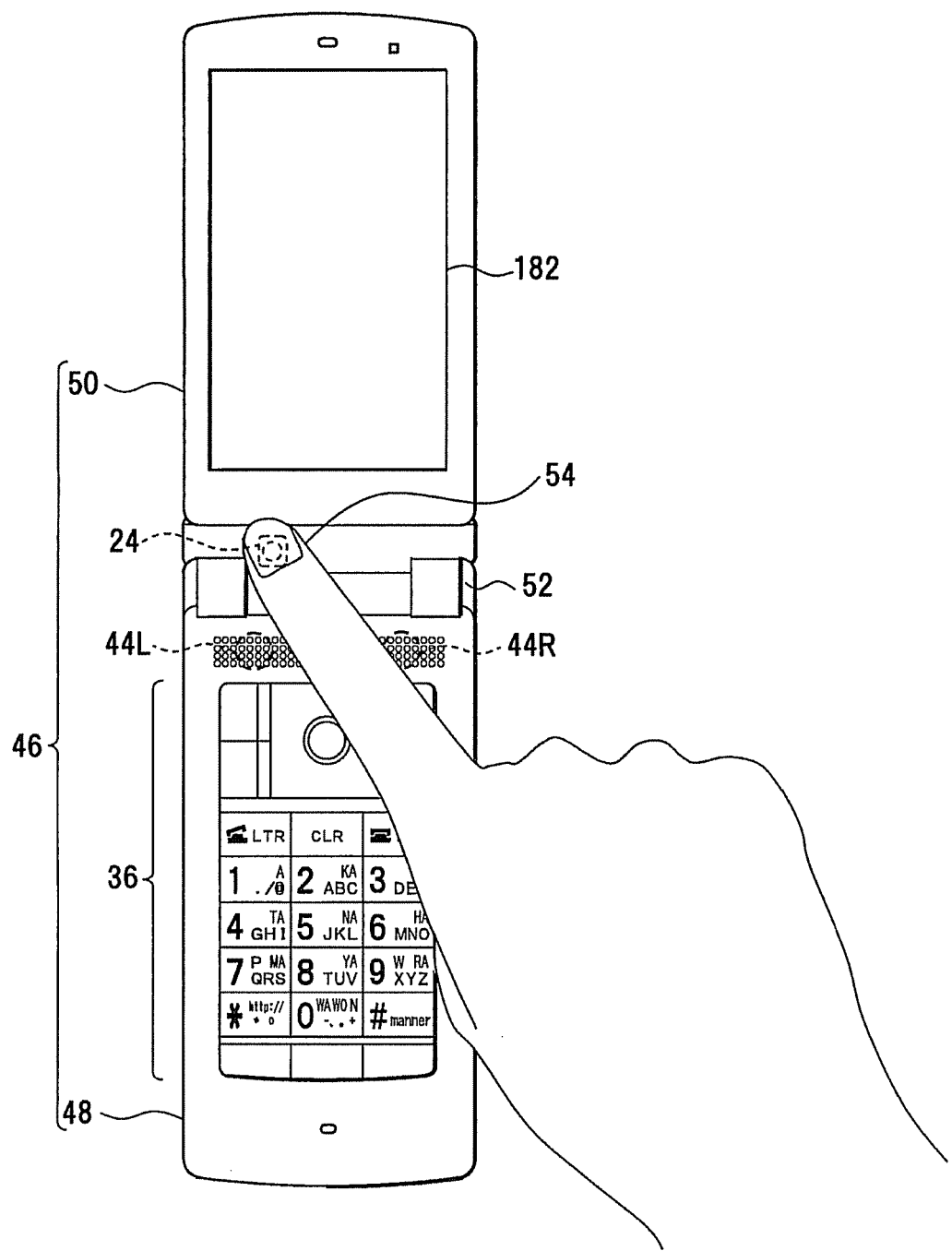
FIG. 6 is a diagram of an example of placement of a finger.

The pulse measurement may be performed with any finger regardless of the right hand or the left hand, such as thumb or index finger and may be performed with either the in-camera unit 24 or the out-camera unit 26. If image information of the index finger is acquired with the in-camera unit 24, while the housing 46 is opened and placed on a table or supported by one hand to keep the housing 46 fixed, a finger tip 54 of the index finger may be placed on the in-camera unit 24, as depicted in FIG. 6.

Figure 7:
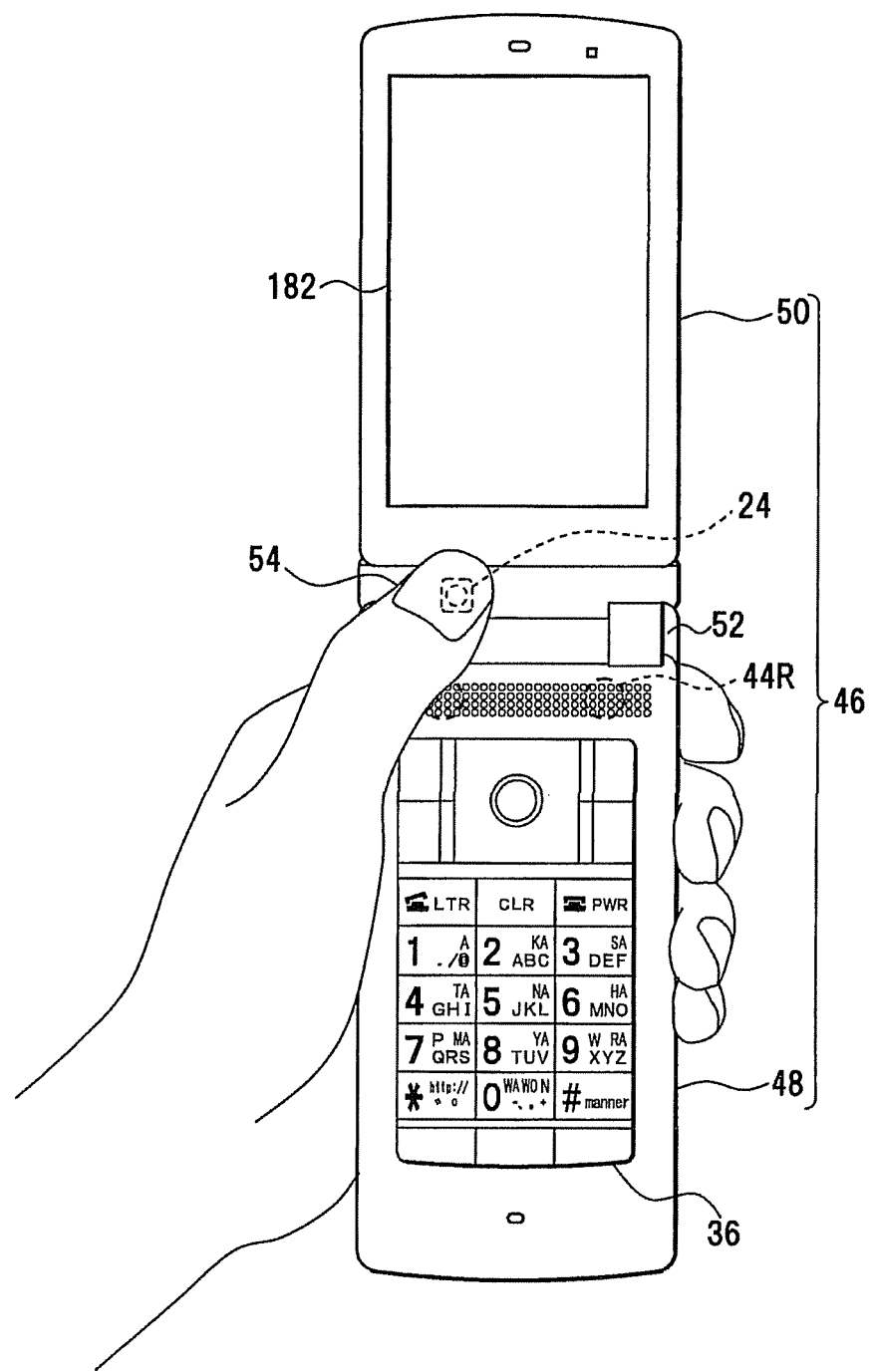
FIG. 7 is a diagram of an example of placement of a finger.

If image information of the thumb is acquired with the in-camera unit 24, while the fixed housing unit 48 of the housing 46 is held in the hand and kept fixed, the finger tip 54 of the thumb may be placed on the in-camera unit 24, as depicted in FIG. 7.

Figure 8:
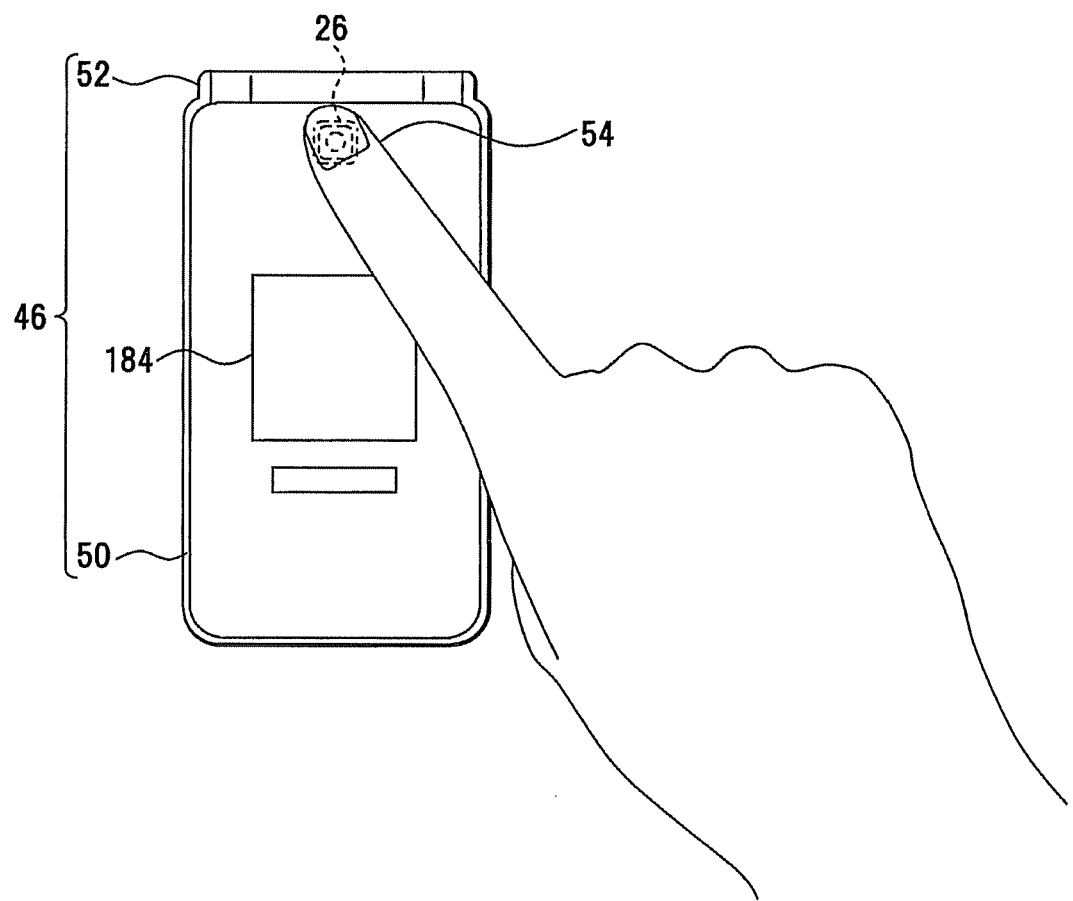
FIG. 8 is a diagram of an example of placement of a finger.

If image information of the index finger is acquired with the out-camera unit 26, while the housing 46 is closed and placed on a table with the movable housing unit 50 up or supported by one hand to keep the housing 46 fixed, a finger tip 54 of the index finger may be placed on the out-camera unit 26, as depicted in FIG. 8.

Figure 9:
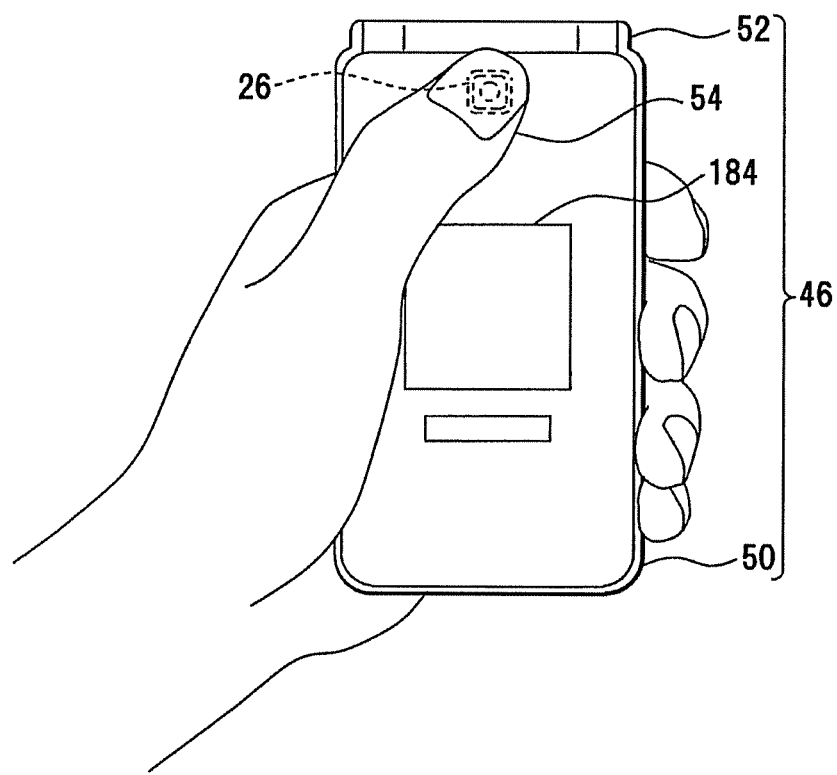
FIG. 9 is a diagram of an example of placement of a finger.

If image information of the thumb is acquired with the out-camera unit 26, while the housing 46 is held in the hand and kept fixed with the movable housing unit 50 up, the finger tip 54 of the thumb may be placed on the out-camera unit 26, as depicted in FIG. 9.

Figure 10:
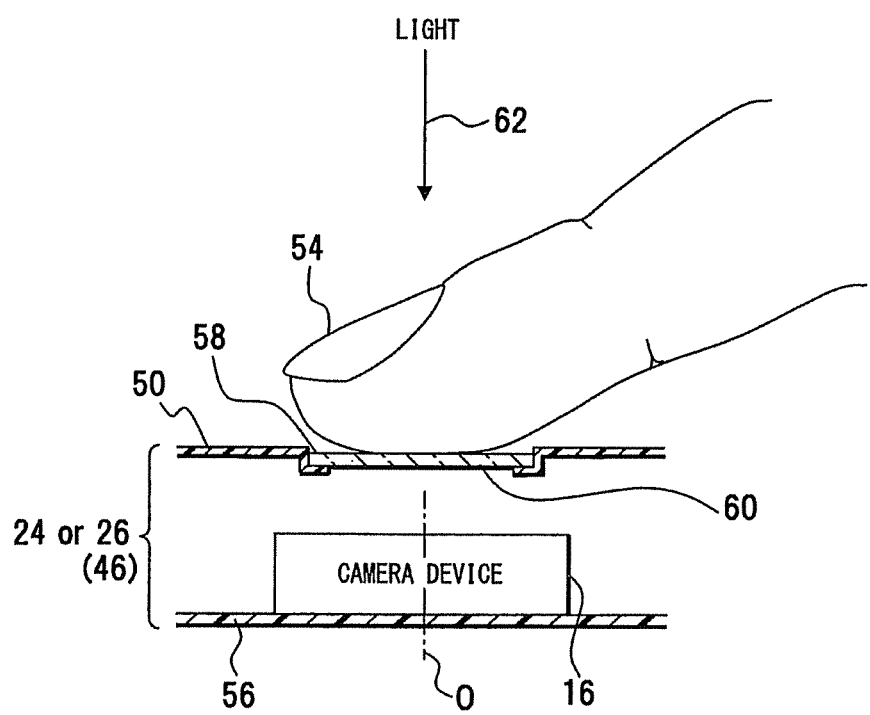
FIG. 10 is a diagram of an example of a camera unit.

The camera unit will then be described with reference to FIG. 10. FIG. 10 depicts an example of the camera unit. The configuration of FIG. 10 is by way of example and the present invention is not limited to this configuration. In FIG. 10, the same reference numerals are added to the same portions as FIGS. 3, 4, and 5.

The in-camera unit 24 and the out-camera unit 26 are examples of the image taking means that acquires image information from the finger tip 54 and, as depicted in FIG. 10, the camera device 16 is disposed on the upper surface of a circuit substrate 56 built into the movable housing unit 50; a window 58 is formed in the movable housing unit 50 covering the objective lens side of the camera device 16; and a light guiding member 60 is attached to the window 58. The light guiding member 60 guides light 62 transmitted through the finger tip 54 placed in the light guiding member 60 to the camera device 16, makes up a placing member for placing the finger tip 54 and a shielding member that shields the window 58, and is made up of a glass plate, etc. The camera device 16 includes an optical system such as a focus mechanism and an image taking device and, for example, CCD (charged coupled device) is used for the image taking device. In FIG. 10, O denotes a light axis.

The placement of a finger and image taking aspects of the camera unit will then be described with FIGS. 11A to 13F. FIGS. 11A to 12B depict examples of the placement of a finger and the image taking aspect of the camera unit and FIGS. 13A to 13F depict pressing areas and positions of a finger tip on the camera unit and image levels. The configurations of FIGS. 11A to 13F are by way of example and the present invention is not limited to these configurations. In FIGS. 11A to 13F, the same reference numerals are added to the same portions as FIGS. 3, 4, 5, and 10.

Figure 11A:
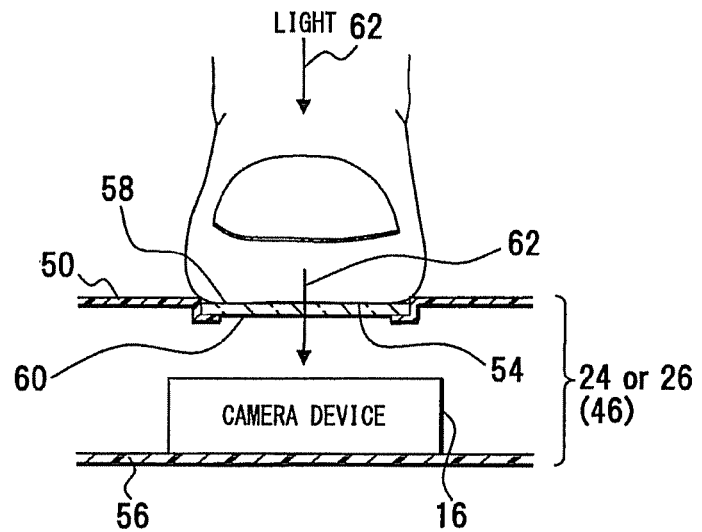
FIGS. 11A to 11C are diagrams of examples of placement of a finger and the image taking aspect of the camera unit.

If the finger tip 54 is tightly pressed against the light guiding member 60 of the window 58, the finger tip 54 is deformed into a flattened shape as depicted in FIG. 11A and becomes congested with blood. Since the blood flow is blocked in this congested state, an amount of the light 62 reaching the camera device 16 is reduced. This is because the light is increasingly absorbed by hemoglobin in the blood.

Figure 11B:
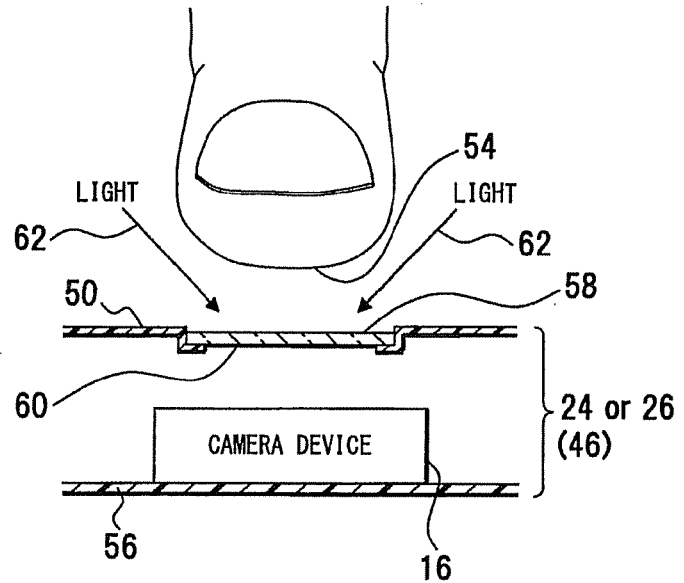

If the finger tip 54 is separated from the light guiding member 60 of the window 58, the window 58 transmits the light 62 not passing through the finger tip 54 as depicted in FIG. 11B and an amount of the light 62 reaching the camera device 16 is increased. The light 62 independent from the blood flow of the finger tip 54 is increased.

Figure 11C:
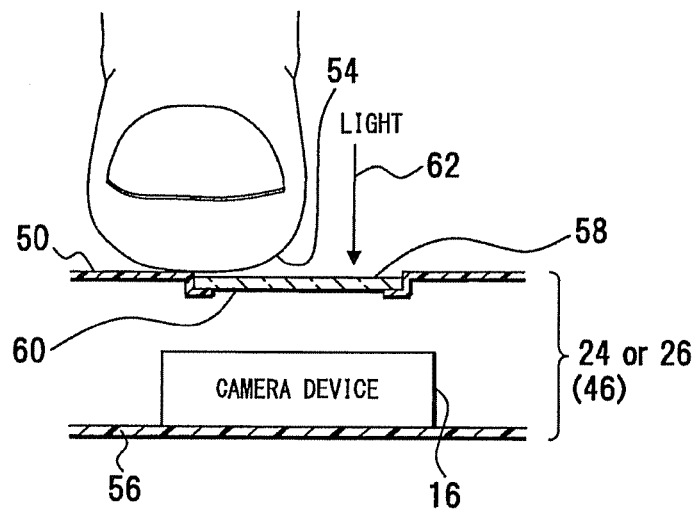

If the finger tip 54 is misaligned from the window 58, the window 58 transmits the light 62 not passing through the finger tip 54 as depicted in FIG. 11C and an amount of the light 62 independent from the blood flow of the finger tip 54 is similarly increased.

Figure 12A:
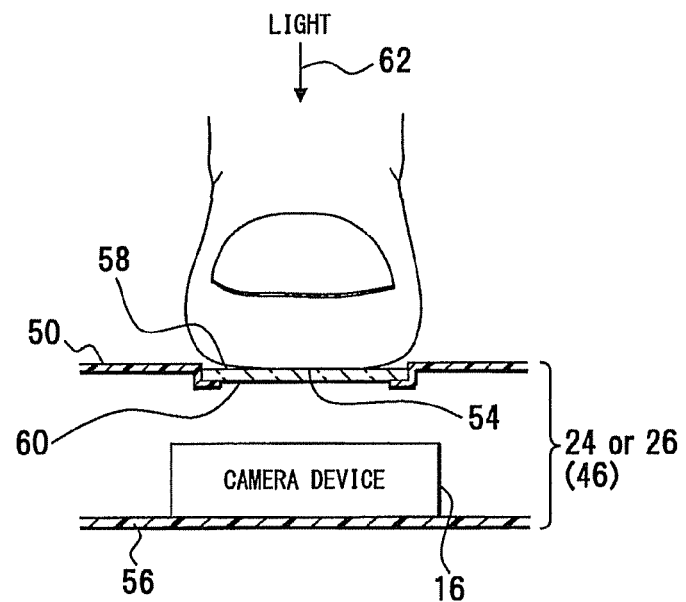
FIGS. 12A and 12B are diagrams of examples of placement of a finger and the image taking aspect of the camera unit.

If the finger tip 54 is properly pressed against the light guiding member 60 of the window 58 and the position thereof is appropriate, the finger tip 54 is slightly deformed to cover the window 58 as depicted in FIG. 12A and the light 62 passes through the finger tip 54 not congested with blood and reaches the camera device 16 at a level depending on the blood flow.

Figure 12B:
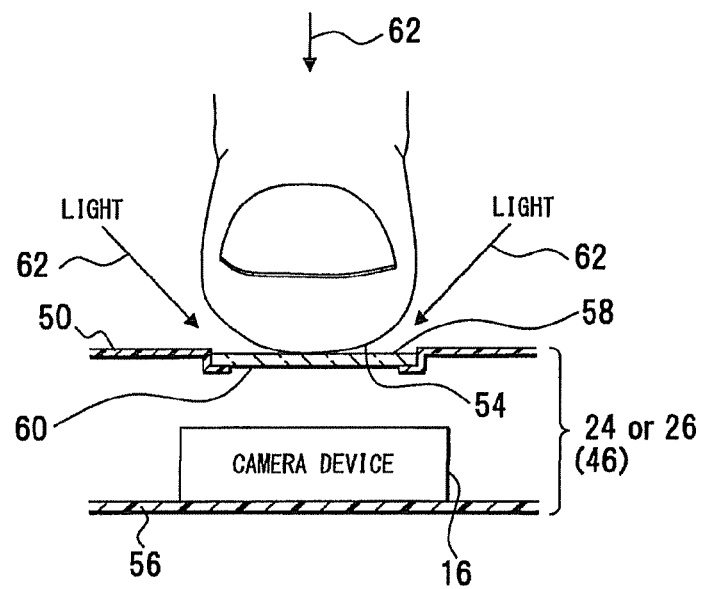

If the finger tip 54 slightly touches the light guiding member 60 of the window 58 as depicted in FIG. 12B, since the light 62 comes in from the sides of the finger tip 54 and reaches the camera device 16, the image information including the light 62 independent from the blood flow is acquired.

Describing the pressing areas and positions of the finger tip and the image levels with reference to FIGS. 13A to 13F, reference numerals $S_0$, $S_1$, $S_2$, $S_3$, $S_4$, and $S_5$ denote statuses representative of the pressing areas and positions of the finger tip 54 covering the window 58 (FIG. 10) of the camera unit (=statuses of pulse amplitude information); P denotes the center of the pressing; and the sizes of $S_0$, $S_1$, $S_2$, $S_3$, $S_4$, and $S_5$ represent levels of the pressing. These levels are represented by $S_0$="0", $S_1$="1", $S_2$="2", $S_3$="3", $S_4$="4", and $S_5$="5" with the level gauge value $L_1$ and are represented by $S_0$="0", $S_1$="3", $S_2$="3", $S_3$="3", $S_4$="4", and $S_5$="5" with the level gauge value $L_2$. In this case, the statuses of the pressing area and the position and the pulse amplitude information are closely related. The proper pulse amplitude information is acquired when the pressing and the position of the finger tip 54 are appropriate. Since the proper pulse amplitude information may be acquired in some cases even if the pressing and the position of the finger tip 54 are somewhat misaligned, i.e., even if the pressing center P is misaligned from the light axis O of the camera device 16, the pulse amplitude information may be indicated by the level gauge values.

Figure 14A:
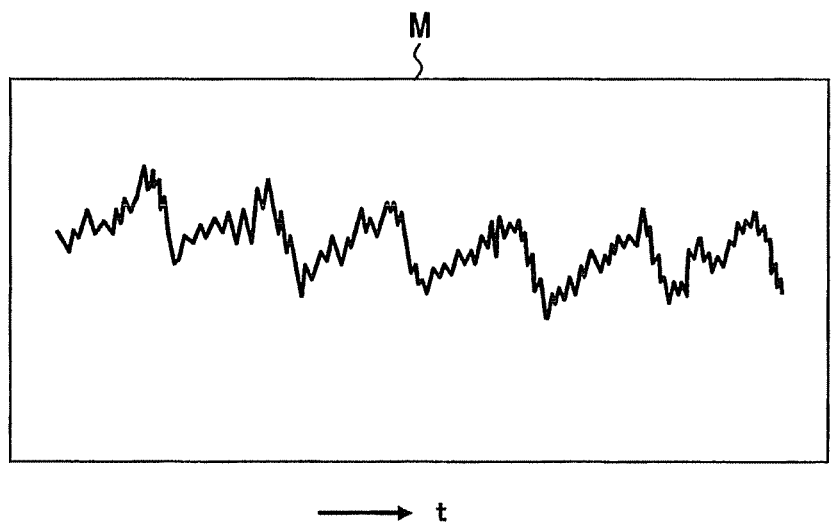
FIGS. 14A and 14B are diagrams of the pulse amplitude and pulses.
Figure 14B:
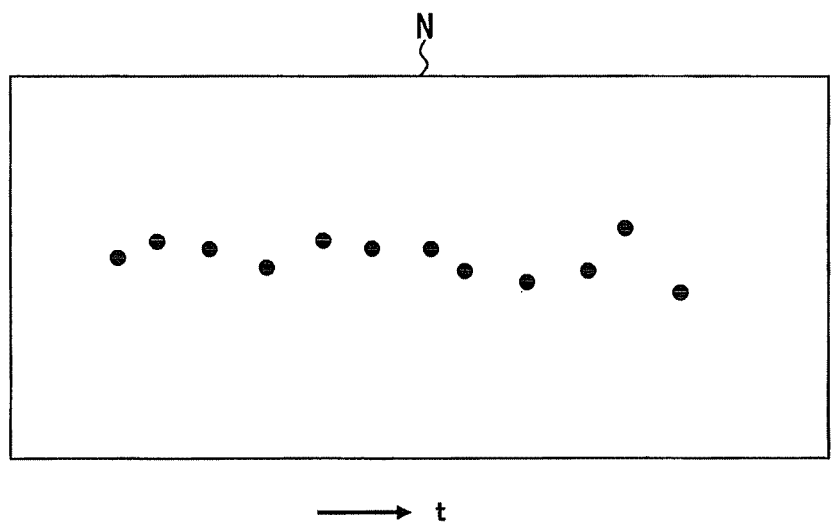
Figure 15:
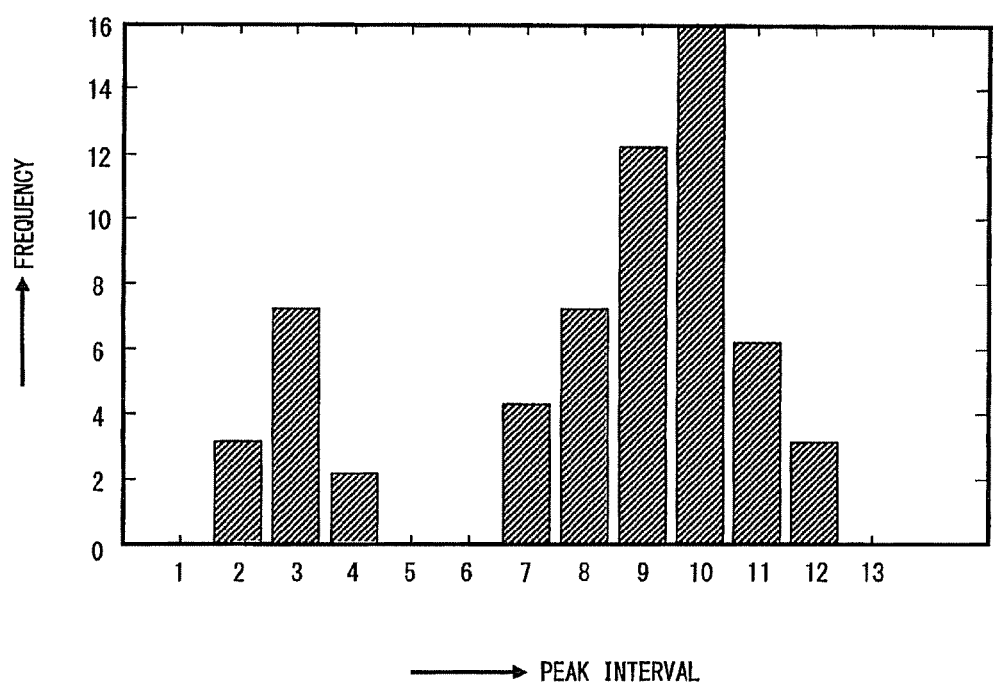
FIG. 15 is a diagram of a histogram of peak intervals used in calculation of the number of pulses.

The pulse amplitude, pulses, and a histogram will then be described with reference to FIGS. 14A to 15. FIGS. 14A and 14B depict the pulse amplitude and pulses and FIG. 15 depicts a histogram of peak intervals. FIGS. 14A to 15 are by way of example and the present invention is not limited to these configurations.

The image information acquired by the camera device 16 is loaded into the image data acquiring unit 802 (FIG. 2) through the camera module unit 4 (FIG. 1) and the blood flow rate variation calculating unit 804 calculates blood flow rate variations from the image information. The pulse amplitude (waveform) M is calculated from the blood flow rate variations as depicted in FIG. 14A. Since light is absorbed by hemoglobin in the blood as above, the luminance of the light is reduced if a flow rate of the blood passing through the finger tip 54 is high and the luminance increased if the blood flow rate is low. The pulse amplitude indicates an amplitude level corresponding to the luminance.

The pulse amplitude M is applied to the peak/pulse amplitude calculating unit 806 and the peak/pulse amplitude calculating unit 806 calculates the maximum values and the minimum values from the pulse amplitude and considers the maximum values as the peaks of the pulses to calculate pulse peaks (throbbing) N as depicted in FIG. 14B.

The histogram generating unit 808 generates a histogram (FIG. 15) of peak interval (time) in a certain time period, for example, a time window up to about 20 seconds and calculates the number of pulses per unit time (e.g., one minute) from the sample of the peak intervals with the peak intervals having probabilities equal to or less than a certain probability removed.

The histogram generated by the histogram generating unit 808 is generated using the peak intervals calculated by the peak/pulse amplitude calculating unit 806 as depicted in FIG. 15. In this case, the histogram is generated with peak intervals in a certain time period, for example, up to about 20 seconds as described above and the mode is obtained at a peak interval of "10".

The guidance table will then be described with reference to FIG. 16. FIG. 16 depicts an exemplary configuration of a guidance table. The configuration of FIG. 16 is by way of example and the present invention is not limited to this configuration.

A guidance table 64 is a data table for recording guidance contents corresponding to image states, is stored in the data storage unit 42, and is referenced by executing a guidance method or the guidance program. The guidance table 64 includes guidance contents 68 for image states 66 acquired by the camera device 16, such as "move finger toward user" if "image is dark", "cover camera with finger" if "image is bright", "place finger on camera" if "no finger is placed", and "follow level gauge guidance table" in "other" cases, as depicted in FIG. 16.

Figure 18A:
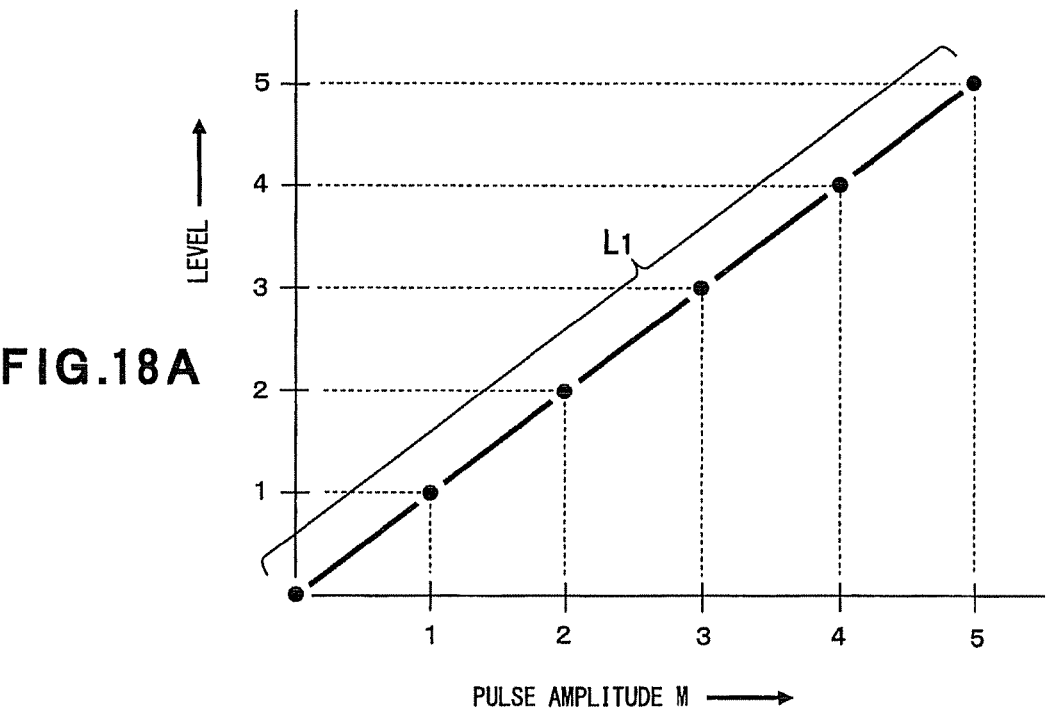
FIGS. 18A and 18B are diagrams of a relationship between the pulse amplitude and the level gauge.
Figure 18B:
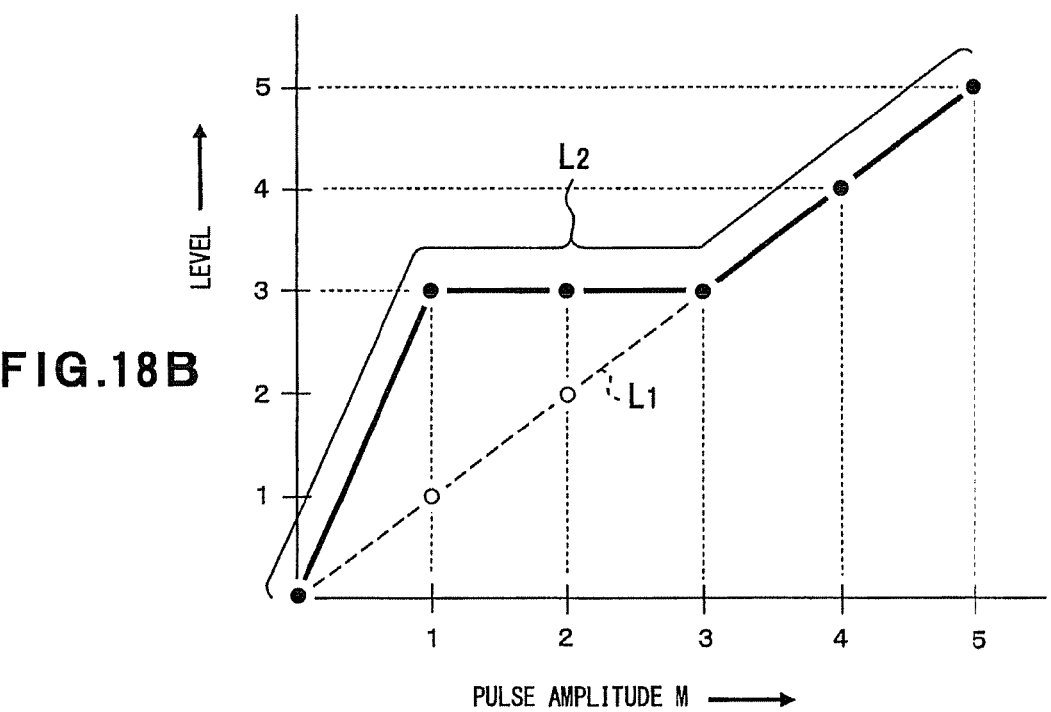

The level gauge guidance table and the level gauge will then be described with reference to FIGS. 17 to 18B. FIG. 17 depicts an exemplary configuration of a level gauge guidance table and FIGS. 18A and 18B depict a relationship between the pulse amplitude and the level gauge. The configurations of FIGS. 17 and 18 are by way of example and the present invention is not limited to these configurations.

A level gauge guidance table 70 is a data table for recording a level gauge corresponding to the pulse amplitude information, is stored in the data storage unit 42, and is referenced by executing the guidance method or the guidance program. A level gauge 74 is set for pulse amplitude information 72 acquired by the camera device 16 as depicted in FIG. 17 in the level gauge guidance table 70, and the level gauge values $L_1$ and the second level gauge values $L_2$ are set for the hard mode and the easy mode, respectively, in the level gauge 74.

If the pulse amplitude may not be acquired from an image, i.e., if amplitude=0, $L_1=L_2=0$ is set; if amplitude=1 (very small), $L_1=1$ is set while $L_2=3$ is set; if amplitude=2 (small), $L_1=2$ is set while $L_2=3$ is set; if amplitude=3 (intermediate), $L_1=L_2=3$ is set; if amplitude=4 (large), $L_1=L_2=4$ is set; and if amplitude=5 (very large), $L_1=L_2=5$ is set.

In this setting of the level gauge guidance table 70, in the case of amplitude=0, the both level gauge outputs are $L_1=L_2=0$; in the case of amplitude=1 (very small), $L_1=1$ if the level gauge value $L_1$ is set while $L_2=3$ if the level gauge value $L_2$ is set; in the case of amplitude=2 (small), $L_1=2$ if the level gauge value $L_1$ is set while $L_2=3$ if the level gauge value $L_2$ is set; and, therefore, the level gauge values are increased if the amplitude is small.

In graphic representation of these relationships, the level gauge value $L_1$ is represented by a linear function with the level uniformly increased relative to the pulse amplitude M as depicted in FIG. 18A while the level gauge value $L_2$ is set to the level gauge value $L_2=3$ for the pulse amplitude M=1, 2, and 3 as depicted in FIG. 18B.

Figure 19:
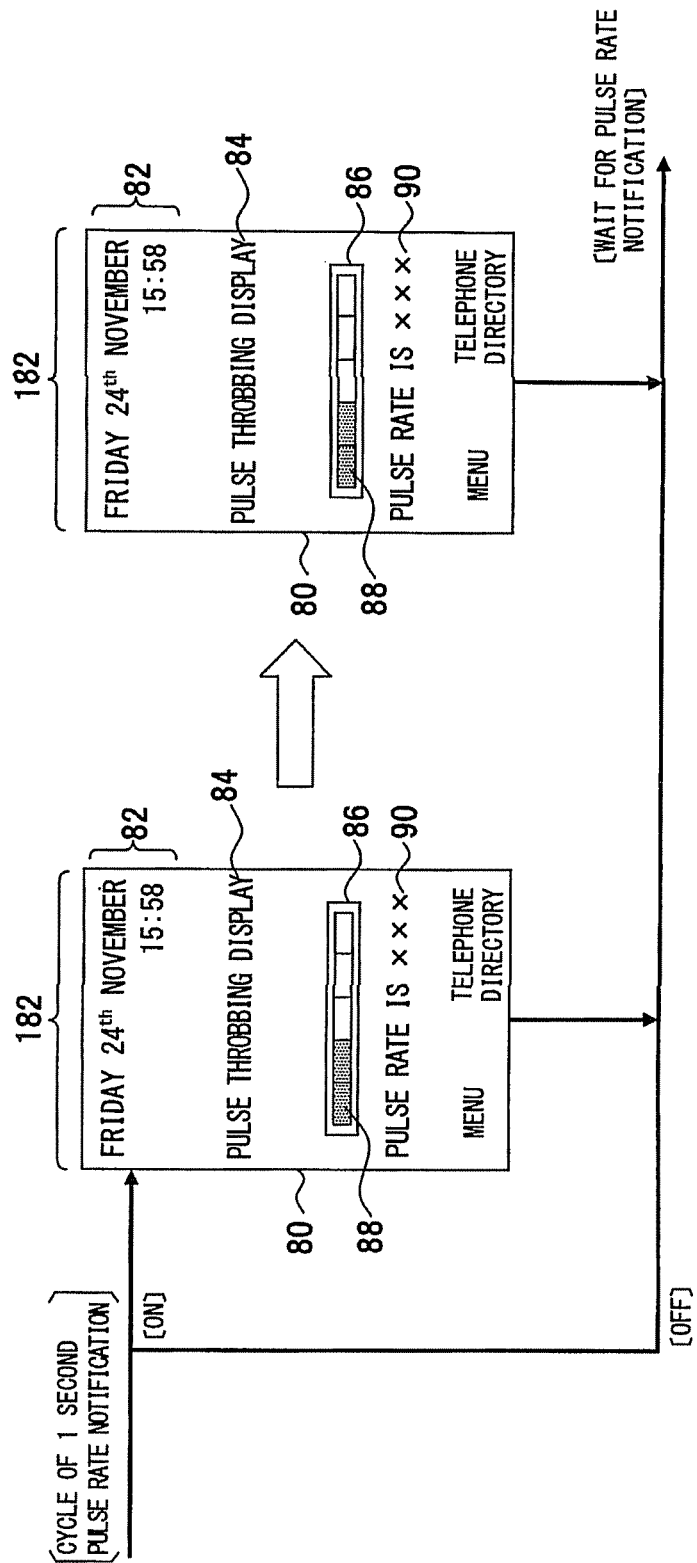
FIG. 19 is a diagram of the level gauge display and the pulse display of a main displaying unit.

The level gauge display and the pulse display will then be described with reference to FIGS. 19 and 20. FIG. 19 depicts the level gauge display and the pulse display of the main displaying unit and FIG. 20 depicts the level gauge display and the pulse display of the sub-displaying unit. The configurations of FIGS. 19 and 20 are by way of example and the present invention is not limited to these configurations. In FIGS. 19 and 20, the same reference numerals are added to the same portions as FIGS. 3, 4, and 5.

When the portable terminal device 20 is opened and used as depicted in FIGS. 6 and 7, a display mode using the main displaying unit 182 is used as depicted in FIG. 19. If the pulse measurement is performed in this state, the main displaying unit 182 displays the measurement result thereof.

The pulse measurement is performed by a certain unit time, for example, for every one second, and when the pulse measurement is completed, the pulse rate notification is turned ON and a display screen 80 is displayed on the main displaying unit 182. The display screen 80 displays calendar and time 82 and "pulse throbbing display" as a title 84; a level gauge displaying unit 86 set in the lower portion displays a level 88; and a pulse displaying unit 90 displays "pulse rate is xxx" for the current pulse rate.

The peak/pulse amplitude of the maximum values of the pulses obtained from the blood flow variations is calculated by a certain unit time, for example, for every 0.1 [second] and the display screen 80 of the main displaying unit 182 is updated in a cycle of one second.

The display of the display screen 80 is repeated until the pulse measurement is terminated; if the pulse rate is not supplied, the display is terminated to wait for the pulse rate notification; and the display contents of the pulse throbbing display is updated based on the notification of the pulse rate. In FIG. 19, a plurality of display screens 80 indicates an updating process of the display contents.

When the portable terminal device 20 is closed and used as depicted in FIGS. 8 and 9, the display mode is switched from the main displaying unit 182 to the sub-displaying unit 184 as depicted in FIG. 20. If the pulse measurement is performed in this state, the sub-displaying unit 184 displays the measurement result thereof.

Since a display screen 92 of the sub-displaying unit 184 has a display area smaller than that of the display screen 80 of the main displaying unit 182, the display contents are simplified. In this case, the simplified level 88 is displayed on the level gauge displaying unit 86. Other display contents are substantially the same and, therefore, given the same reference numerals and will not be described.

Figure 21A:
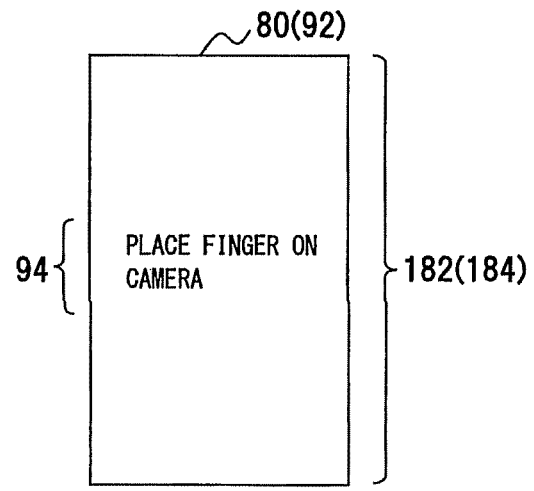
FIGS. 21A to 21C are diagrams of the guidance display.

The guidance display will then be described with reference to FIG. 21. FIG. 21A to 21C are diagrams of the guidance display. The configuration of FIG. 21 is by way of example and the present invention is not limited to this configuration.

The guidance display is an example of the guidance method or the program thereof and corresponds to the image states and guidance contents in the guidance table (FIG. 16).

If no finger is placed on the camera unit 24 or 26, the outside light reaches the camera device 16 and an image exhibits a simply bright state. Since it is detected that no finger is placed from this state in this case, guidance display 94, for example, "place finger on camera" is displayed as depicted in FIG. 21A on the display screen 80 or the display screen 92 of the main displaying unit 182 or the sub-displaying unit 184 to prompt a user to place a finger on the camera.

Figure 21B:
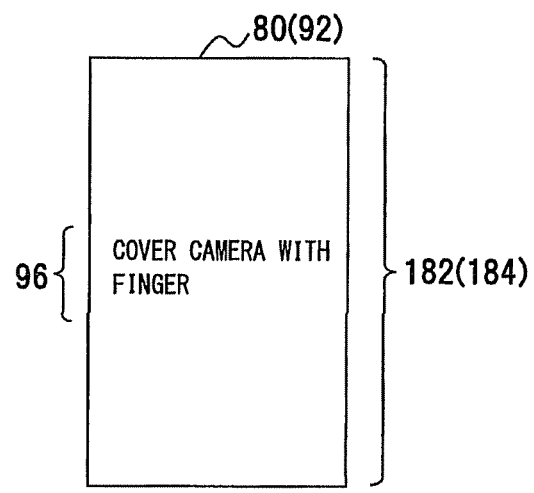
Figure 21C:
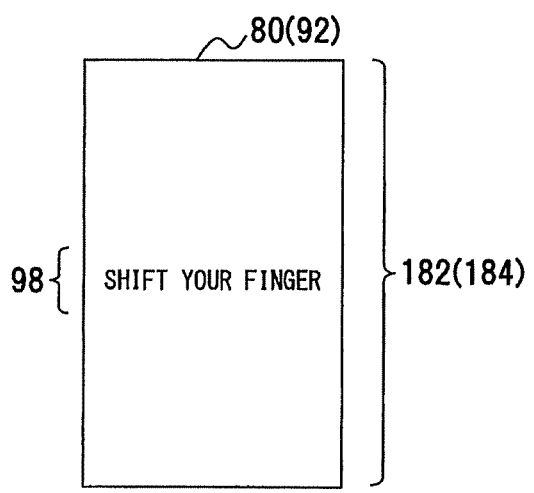

Even when a finger is placed on the camera unit 24 or 26, if the outside light reaches the camera device 16 and an image state is the bright state, it is detected that the window 58 (FIG. 12B) is not covered by a finger from this state and, therefore, guidance display 96, for example, "cover camera with finger" is displayed as depicted in FIG. 21B on the display screen 80 or the display screen 92 of the main displaying unit 182 or the sub-displaying unit 184 to prompt a user to properly place a finger on the camera.

Even when a finger is placed on the camera unit 24 or 26, if the image state is dark, since it is detected that the placement of the finger is not appropriate and, therefore, guidance display 98, for example, "shift your finger" is displayed as depicted in FIG. 21C on the display screen 80 or the display screen 92 of the main displaying unit 182 or the sub-displaying unit 184 to notify a user of the improper finger placement and prompt a user to correct the placement.

Figure 22:
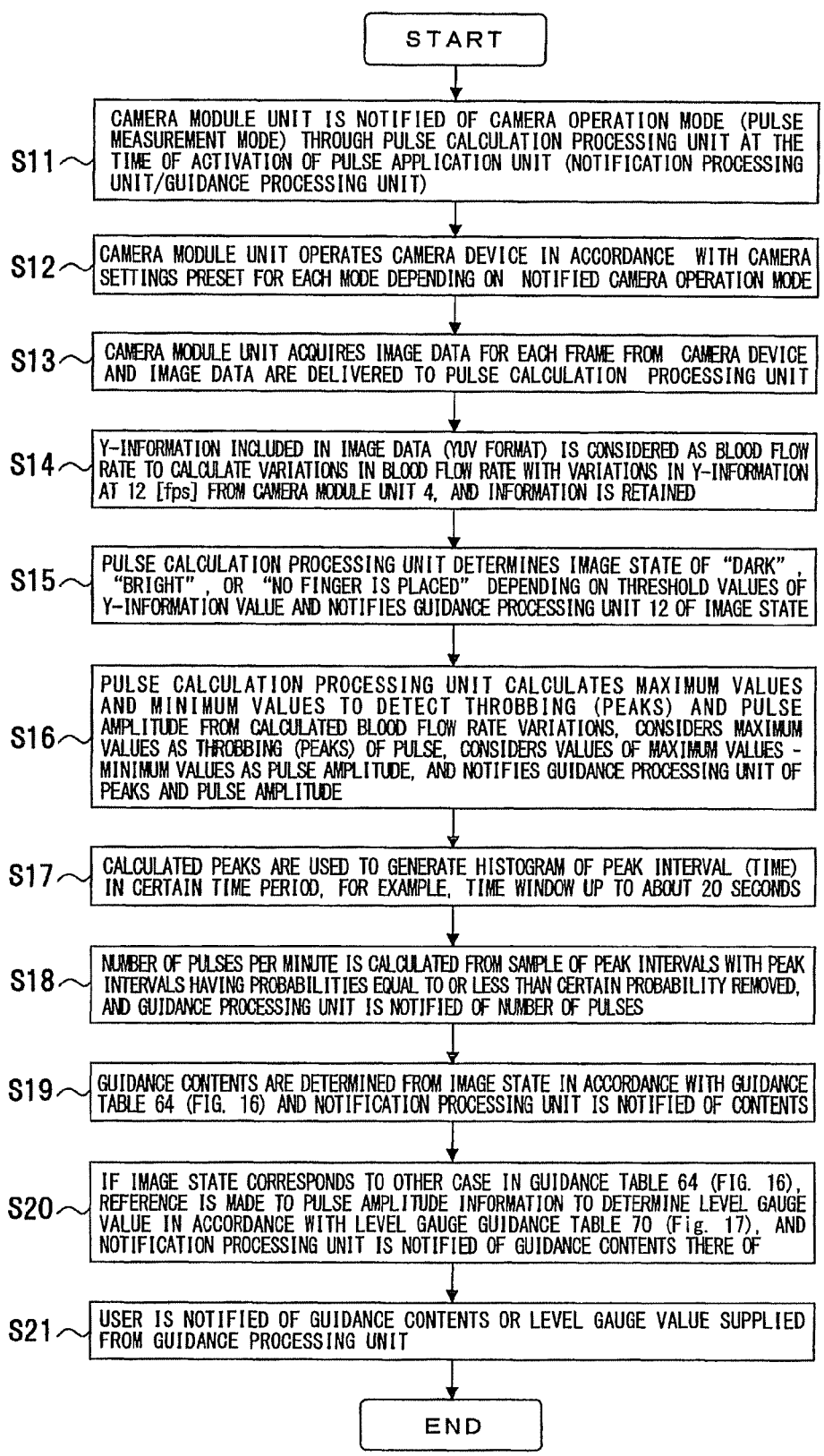
FIG. 22 is a flowchart of a process procedure of pulse measurement.

The pulse measurement will then be described with reference to FIG. 22. FIG. 22 is a flowchart of a process procedure of pulse measurement. The configuration of FIG. 22 is by way of example and the present invention is not limited to this configuration.

This process procedure is an example of the guidance method or the guidance program and includes a process procedure of the pulse measurement, a guidance process through the guidance table 64 (FIG. 16), and a guidance process through the level gauge guidance table 70 (FIG. 17).

In this process procedure, as depicted in FIG. 22, when a mode is changed by selecting a pulse measurement mode from a menu, the camera module unit 4 is notified of a camera operation mode (pulse measurement mode) through the pulse calculation processing unit 8 at the time of the activation of the pulse application unit 10 (the notification processing unit 14/the guidance processing unit 12) (step S11).

The camera module unit 4 operates the camera device 16 in accordance with camera settings preset for each mode depending on the camera operation mode of the notification (step S12). In this case, the camera module unit 4 acquires image data for each frame from the camera device 16 and the image data are delivered to the pulse calculation processing unit 8 (step S13).

The Y-information included in the acquired image information, i.e., the image data (YUV format) is considered as a blood flow rate to calculate variations in the blood flow rate with variations in the Y-information at, for example, 12 [fps] from the camera module unit 4 and the information is retained (step S14).

The pulse calculation processing unit 8 determines the image state of "dark", "bright", or "no finger is placed" depending on the threshold values of the Y-information value and notifies the guidance processing unit 12 of the image state (step S15).

The pulse calculation processing unit 8 calculates the maximum values and the minimum values to detect the throbbing (peaks) of the pulse and the pulse amplitude from the calculated blood flow rate variations, considers the maximum values as the throbbing (peaks), considers values of the maximum values—the minimum values as the pulse amplitude, and notifies the guidance processing unit 12 of the peaks and the pulse amplitude (step S16).

The calculated peaks are used to generate a histogram (FIG. 15) of peak interval (time) in a certain time period, for example, a time window up to about 20 seconds (step S17). The number of pulses, for example, per minute is calculated from the sample of the peak intervals with the peak intervals having probabilities equal to or less than a certain probability removed and the guidance processing unit 12 is notified of the number of pulses (step S18).

The guidance contents are determined from the image state in accordance with the guidance table 64 (FIG. 16) and the notification processing unit 14 is notified of the contents (step S19). If the image state corresponds to other case in the guidance table 64 (FIG. 16), a reference is made to the pulse amplitude information to determine a level gauge value in accordance with the level gauge guidance table 70 (FIG. 17), and the notification processing unit 14 is notified of the guidance contents thereof (step S20). A user is notified of the guidance contents or the level gauge value supplied from the guidance processing unit 12 (step S21). This notification is performed by the display on the displaying unit 18 or through the speakers 44L and 44R.

With such a process procedure, the user's finger placement is guided to the appropriate position and the user is prompted to correct to the appropriate position, resulting in the accurate pulse measurement and the credible measurement results.

Figure 23:
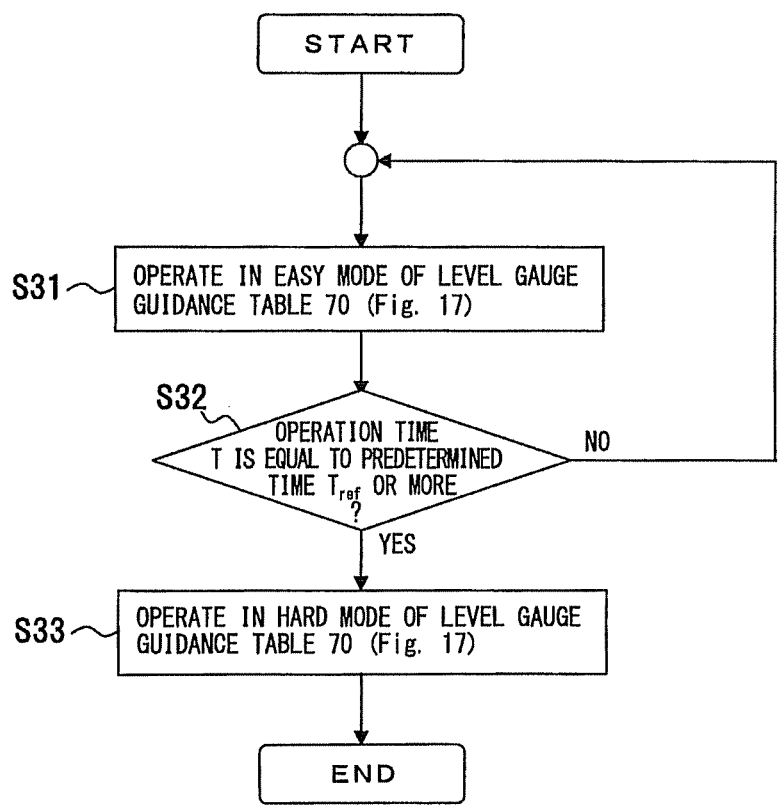
FIG. 23 is a flowchart of a process procedure of the guidance through the level gauge.
Figure 24:
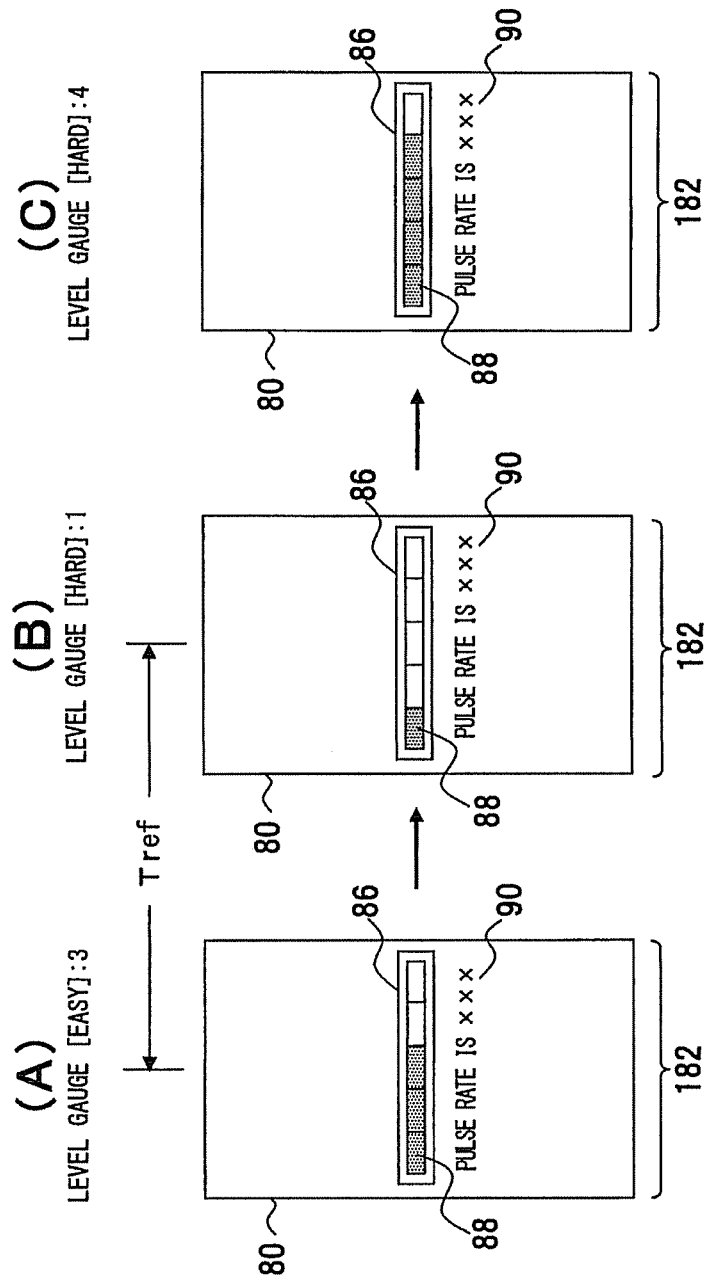
FIGS. 24A to 24C are diagrams of transitions of guidance contents.
Figure 25:
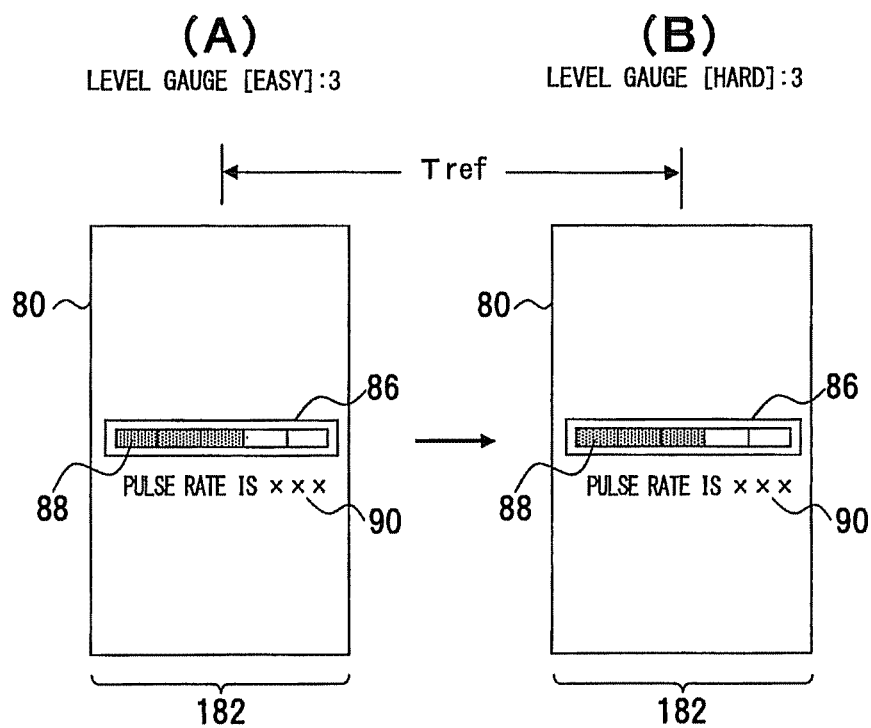
FIGS. 25A to 25B are diagrams of transitions of guidance contents.

The guidance through the level gauge will then be described with reference to FIGS. 23 to 26. FIG. 23 is a flowchart of a process procedure of the guidance through the level gauge and FIGS. 24A to 26 depict transitions of guidance contents. The configurations of FIGS. 23 to 26 are by way of example and the present invention is not limited to these configurations. In FIGS. 24A to 25, the same reference numerals are added to the same portions as FIGS. 19 and 20.

This process procedure is a process of performing guidance by the level gauge display through transition of display from the easy mode to the hard mode to prompt a user to perform correction to the appropriate position and is a subroutine of step S21 (FIG. 22). In this process procedure, the transition from the easy mode to the hard mode is controlled by a certain time period. This certain time period makes up a teaching period for guiding the user's finger placement to the appropriate position and the display associated with the switching of evaluation from the easy mode to the hard mode triggers a user to correct the finger placement.

In this process procedure, as depicted in FIG. 23, the notification of the guidance contents and the level gauge value from the guidance processing unit 12 triggers the operation in the easy mode of the level gauge guidance table 70 (FIG. 17) (step S31). When the level gauge display in the easy mode is started, for example, time elapses from the start time point and it is determined whether the operation time T is equal to a predetermined time $T_{ref}$, for example, 20 [seconds] or more (step S32). Until the operation time T reaches the predetermined time $T_{ref}$, the easy mode is continued and the display thereof is performed.

When the operation time T of the easy mode reaches the predetermined time $T_{ref}$, i.e., when the operation time T is equal to the predetermined time $T_{ref}$ or more (YES at step S32) the operation is performed in the hard mode of the level gauge guidance table 70 (step S33) and returns to the main routine (FIG. 22).

In such guidance through the level gauge, the easy mode comes first. Since the level gauge value $L_2=3$ is set if amplitude=1 in this case because of the execution of the easy mode (FIG. 17), the level 88 indicative of the value is displayed on the level gauge displaying unit 86 of the display screen 80 of the main displaying unit 182 as depicted in FIG. 24A.

When the predetermined time $T_{ref}$, for example, 20 [seconds] elapses from the display of the easy mode, the transition of operation is made from the easy mode to the hard mode and, since the level gauge value $L_1=1$ is set if amplitude=1 (FIG. 17), the level 88 indicative of the value is displayed on the level gauge displaying unit 86 of the display screen 80 of the main displaying unit 182 as depicted in FIG. 24B.

Such a change in the level gauge display indicates that the user's finger placement is not appropriate and prompts correction to the appropriate position with the change in the display.

If the user corrects the finger placement to the appropriate position based on such guidance display, the value may be shifted to the level gauge value $L_1=4$ in the hard mode as depicted in FIG. 24C. This leads to the accurate pulse measurement and the credible measurement results from the appropriate finger placement.

Since the level gauge value $L_2=3$ is set if amplitude=3 in this case because of the execution of the easy mode (FIG. 17), the level 88 indicative of the value is displayed on the level gauge displaying unit 86 of the display screen 80 of the main displaying unit 182 as depicted in FIG. 25. The transition of operation is made from the easy mode to the hard mode when the predetermined time $T_{ref}$ elapses from the display of the easy mode. Since the level gauge value $L_1=3$ is set if amplitude=3 (FIG. 17), the same level 88 is indicated on the level gauge displaying unit 86 of the display screen 80 of the main displaying unit 182 as depicted in FIG. 25. The level gauge display is not changed in this case. The pulse measurement may be performed with such level gauge display. Since the level gauge value $L_1=3$ is the intermediate value, a user is subjected to the psychological effect toward the higher level display and is prompted to perform correction to a more appropriate position due to this display. This leads to the accurate pulse measurement and the credible measurement results from the appropriate finger placement.

Figure 26:
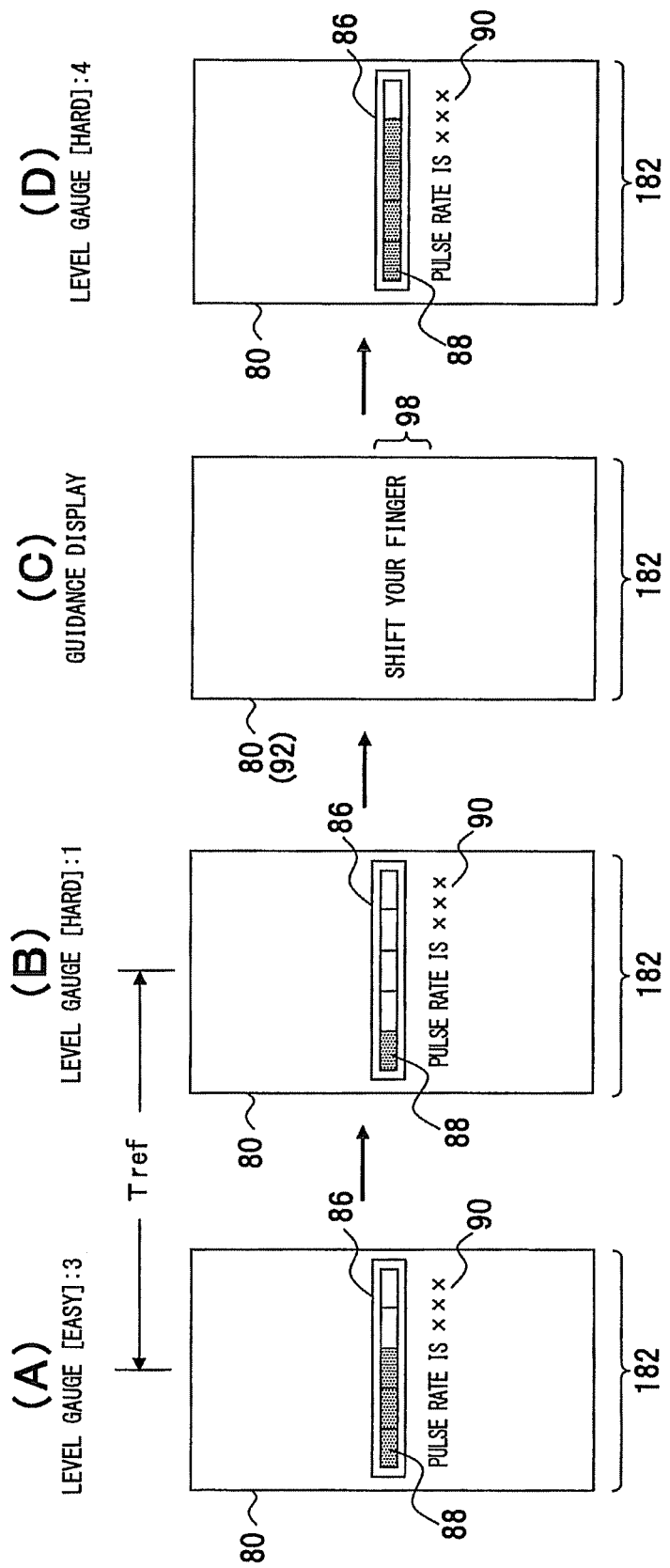
FIGS. 26A to 26D are diagrams of transitions of guidance contents.

In such level gauge display, the display screen 80 of the main displaying unit 182 may be switched from the level gauge display to the guidance display as depicted in FIG. 26 and, for example, "shift your finger" may be displayed as the guidance display 98 to notify a user that the current finger placement is not appropriate. FIGS. 26(A), 26(B), and 26(D) are the same as FIGS. 24A, 24B, and 24C and, therefore, given the same reference numerals and will not be described. The level gauge display in the display screen 80 of the main displaying unit 182 is described in FIGS. 24A to 26. The similar level gauge display may be performed on the display screen 92 of the sub-displaying unit 182.

Features and advantages of the first embodiment described above will be listed as follows.

(1) In the above embodiment, simple and immediate level gauge display may be performed for the appropriate finger placement on the camera device 16 with the use of the pulse amplitude to guide a user.

(2) In the above embodiment, simple and immediate level gauge display may be performed for the appropriate finger placement on the camera device 16 with the use of the pulse amplitude and the pulse rate credibility information to guide a user.

(3) The guidance for appropriate finger placement may be given based on the amplitude information of pulses detected from image data acquired from the camera device 16.

(4) At the time of the finger placement guidance, a user may easily learn and become familiarized with the appropriate pressing of a finger through the guidance.

[b] Second Embodiment

A second embodiment will be described with reference to FIGS. 27, 28, 29, and 30. FIGS. 27 to 30 are flowcharts of the mode switching according to the second embodiment. The configurations of FIGS. 27 to 30 are by way of example and the present invention is not limited to these configurations.

Figure 29:
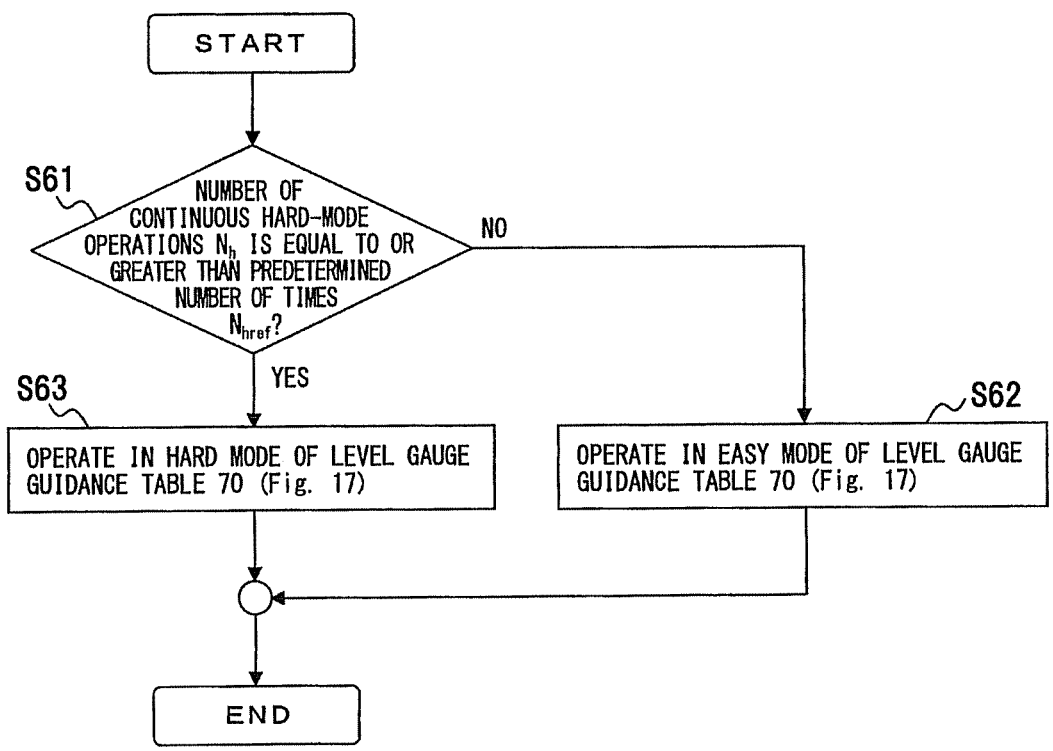
FIG. 29 is a flowchart of the mode switching.
Figure 30:
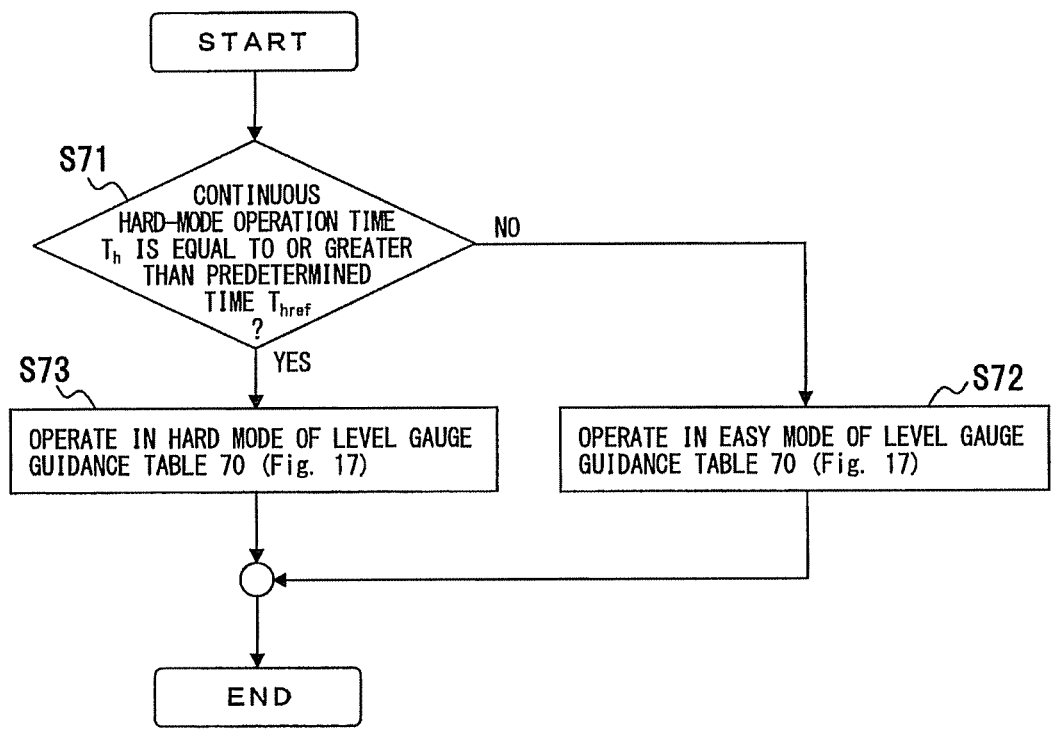
FIG. 30 is a flowchart of the mode switching.

The elapse of the operation time T of the easy mode is set as the switching criterion for the switching from the easy mode to the hard mode in the first embodiment, the switching may be a process with the number of usages N set as the switching criterion (FIG. 27), a process with the usage time $T_m$ set as the switching criterion (FIG. 28), a process with the number of continuous hard-mode operations $N_h$ set as the switching criterion (FIG. 29), or a process with the continuous hard-mode operation time $T_h$ set as the switching criterion (FIG. 30). The constituent elements used in this embodiment are the same as those of the first embodiment, such as the above described guidance apparatus 2 (FIGS. 1 and 2) and portable terminal device 20 (FIG. 3).

Figure 27:
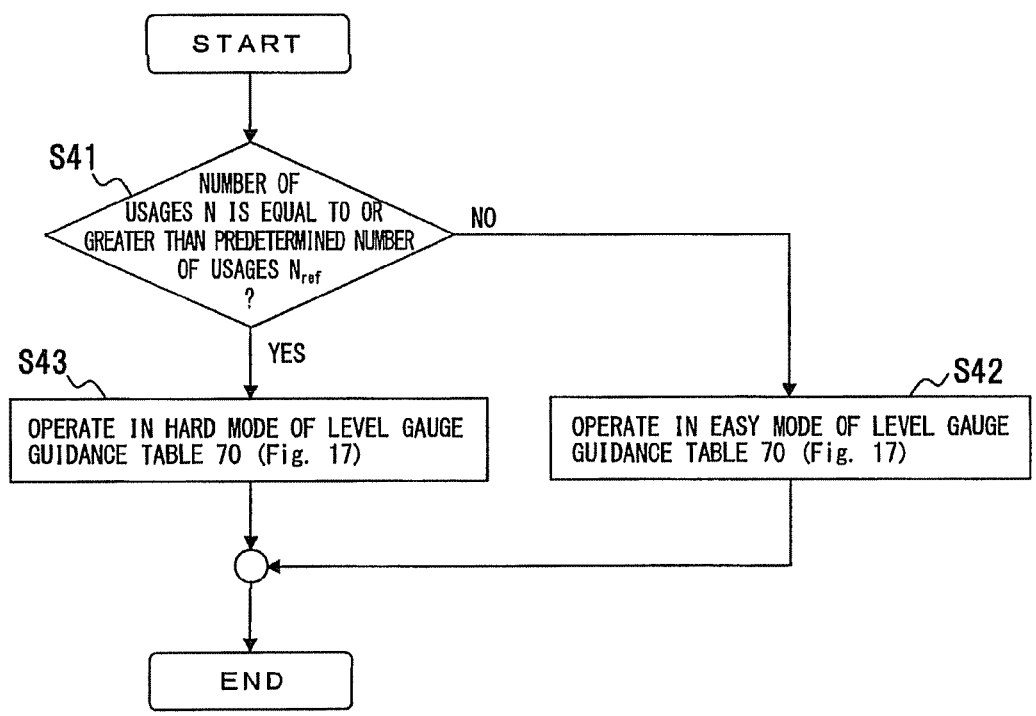
FIG. 27 is a flowchart of mode switching according to a second embodiment.

In a process procedure using the number of usages N as the switching criterion, as depicted in FIG. 27, it is determined whether the number of usages N is equal to or greater than a predetermined number of usages $N_{ref}$, for example, 10 times (step S41). If $N<N_{ref}$ i.e., the number is less than 10 times at step S41 (NO at step S41), it is considered that a learning level of a user is low, and the operation is performed in the easy mode of the level guidance table 70 (FIG. 17) (step S42) and the display thereof is executed. If $N≥N_{ref}$ i.e., the number of usages N is equal to 10 times or more (YES at step S41), it is considered that a learning level of a user is high, and the operation is performed in the hard mode of the level guidance table 70 (step S43) and the display thereof is executed.

Figure 28:
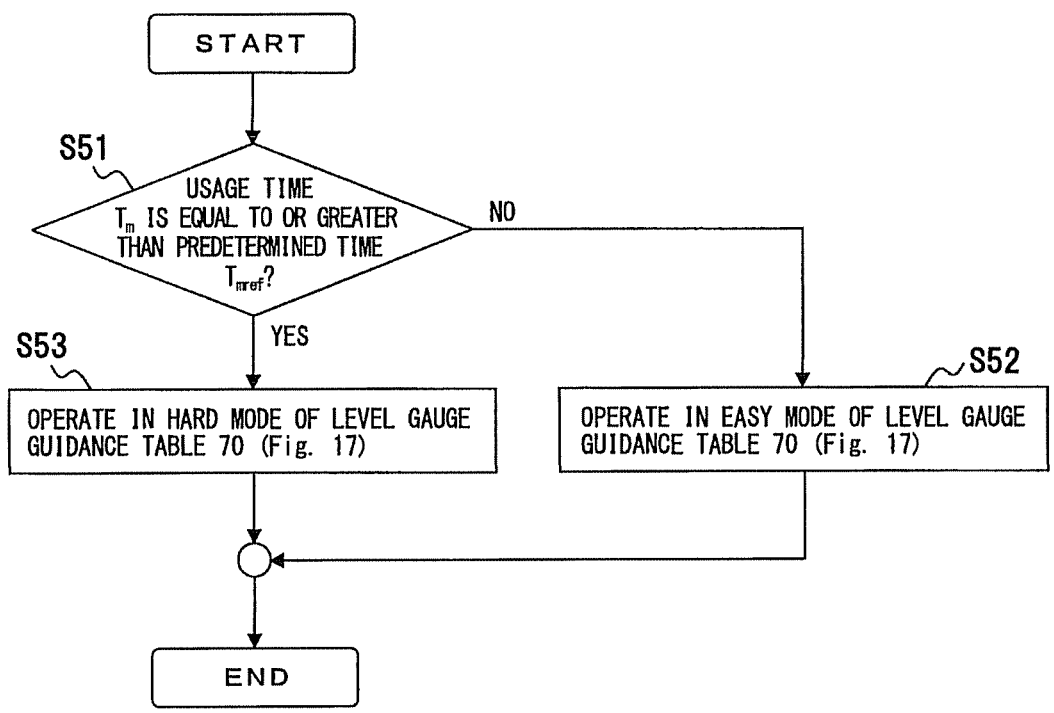
FIG. 28 is a flowchart of the mode switching.

In a process procedure using the usage time $T_m$ as the switching criterion, as depicted in FIG. 28, it is determined whether the usage time $T_m$ is equal to or greater than a predetermined time $T_{mref}$, for example, 60 minutes (step S51). If $T_m<T_{mref}$ i.e., the time is less than 60 minutes at step S51 (NO at step S51), it is considered that a learning level of a user is low, and the operation is performed in the easy mode of the level guidance table 70 (FIG. 17) (step S52) and the display thereof is executed. If $T_m≥T_{mref}$ i.e., the usage time $T_m$ is equal to 60 minutes or more (YES at step S51), it is considered that a learning level of a user is high, and the operation is performed in the hard mode of the level guidance table 70 (step S53) and the display thereof is executed.

In a process procedure using the number of continuous hard-mode operations $N_h$ as the switching criterion, as depicted in FIG. 29, it is determined whether the number of operations $N_h$ is equal to or greater than a predetermined number of times $N_{href}$, for example, 10 times (step S61). If $N_h<N_{href}$ i.e., the number is less than 10 times at step S61 (NO at step S61), it is considered that a learning level of a user is low, and the operation is performed in the easy mode of the level guidance table 70 (FIG. 17) (step S62) and the display thereof is executed. If $N_h≥N_{href}$ i.e., the number of operations $N_h$ is equal to 10 times or more (YES at step S61), it is considered that a learning level of a user is high, and the operation is performed in the hard mode of the level guidance table 70 (step S63) and the display thereof is executed.

In a process procedure using the continuous hard-mode operation time $T_h$ as the switching criterion, as depicted in FIG. 30, it is determined whether the operation time $T_h$ is equal to or greater than a predetermined time $T_{href}$, for example, 60 minutes (step S71). If $T_h<T_{href}$ i.e., the operation time $T_h$ is less than 60 minutes at step S71 (NO at step S71), it is considered that a learning level of a user is low, and the operation is performed in the easy mode of the level guidance table 70 (FIG. 17) (step S72) and the display thereof is executed. If $T_h≥T_{href}$ i.e., the operation time $T_h$ is equal to 60 minutes or more (YES at step S71), it is considered that a learning level of a user is high, and the operation is performed in the hard mode of the level guidance table 70 (step S73) and the display thereof is executed.

By switching the easy mode and the hard mode based on whether the number of usages, the usage time, the number of continuous hard-mode operations, or the continuous hard-mode operation time reaches a reference value, the user's finger placement may be led to the appropriate position and the pulse may be measured at the appropriate position to improve the measurement accuracy.

[c] Third Embodiment

Figure 32:
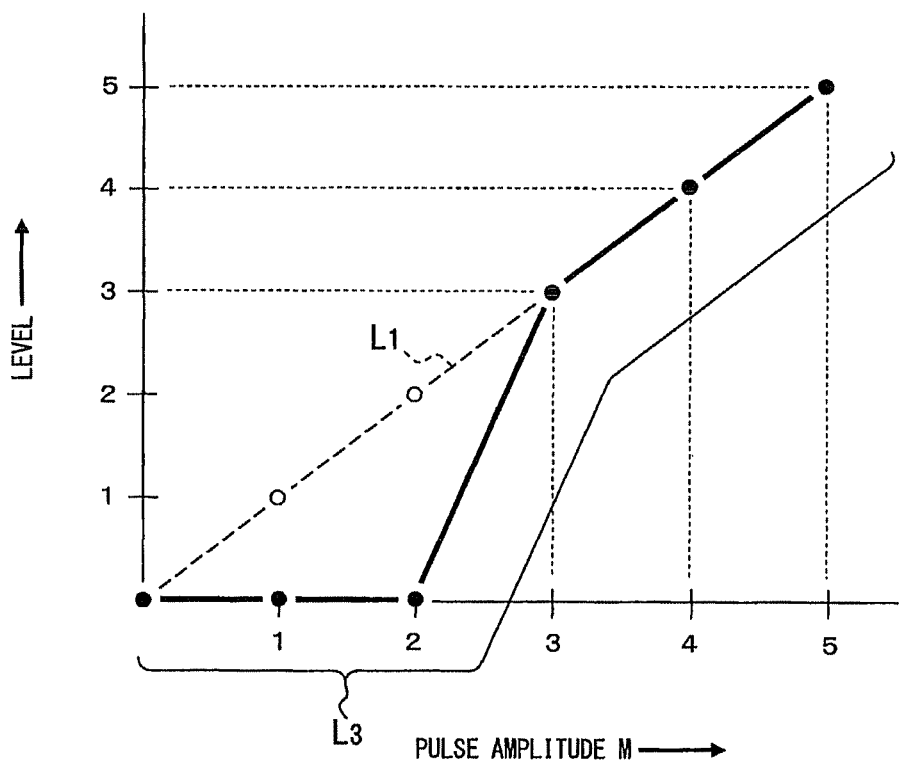
FIG. 32 is a diagram of a relationship between the pulse amplitude and the level gauge.
Figure 33:
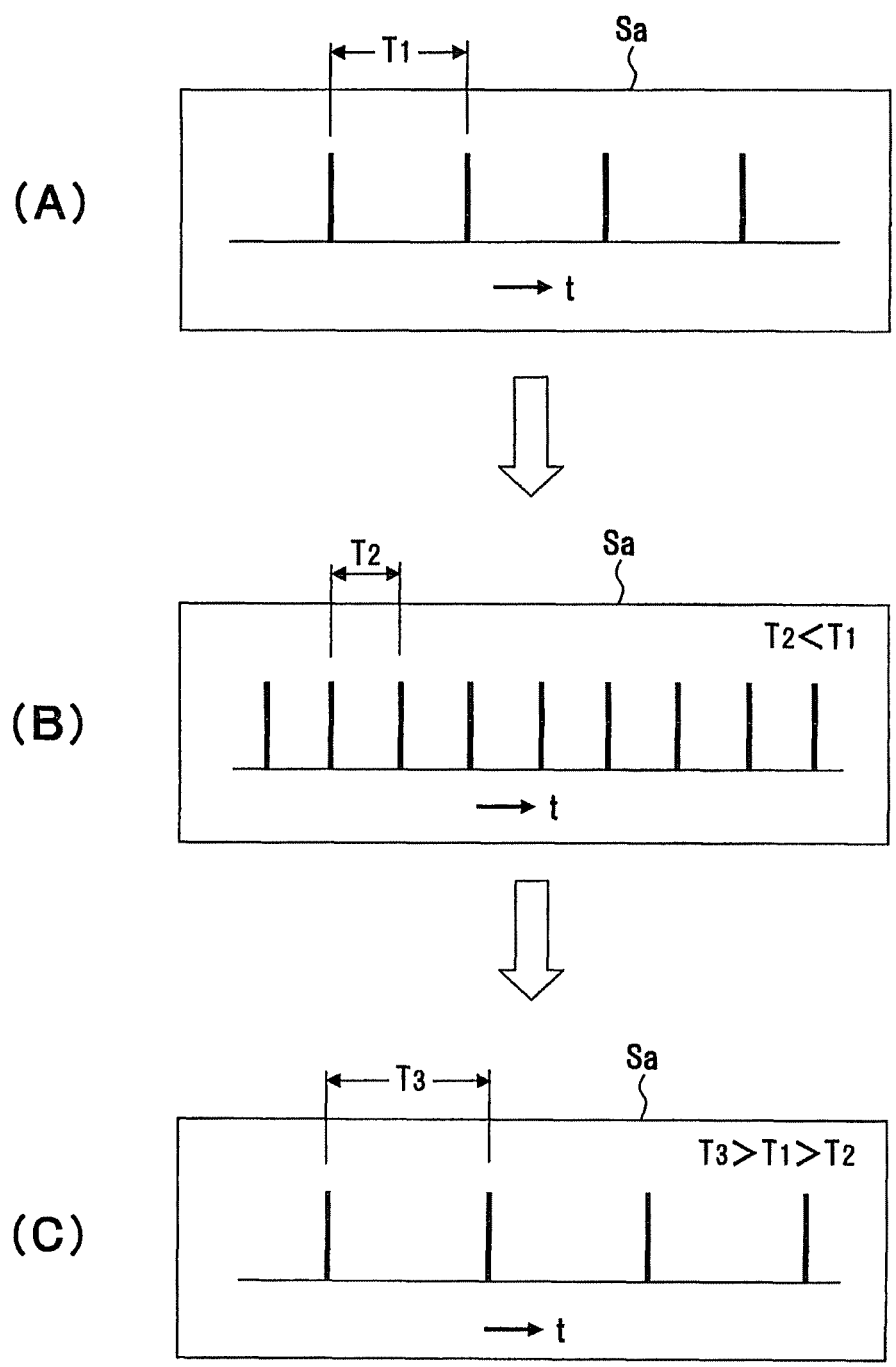
FIGS. 33A to 33C are diagrams of sound guidance according to a fourth embodiment.
Figure 34:
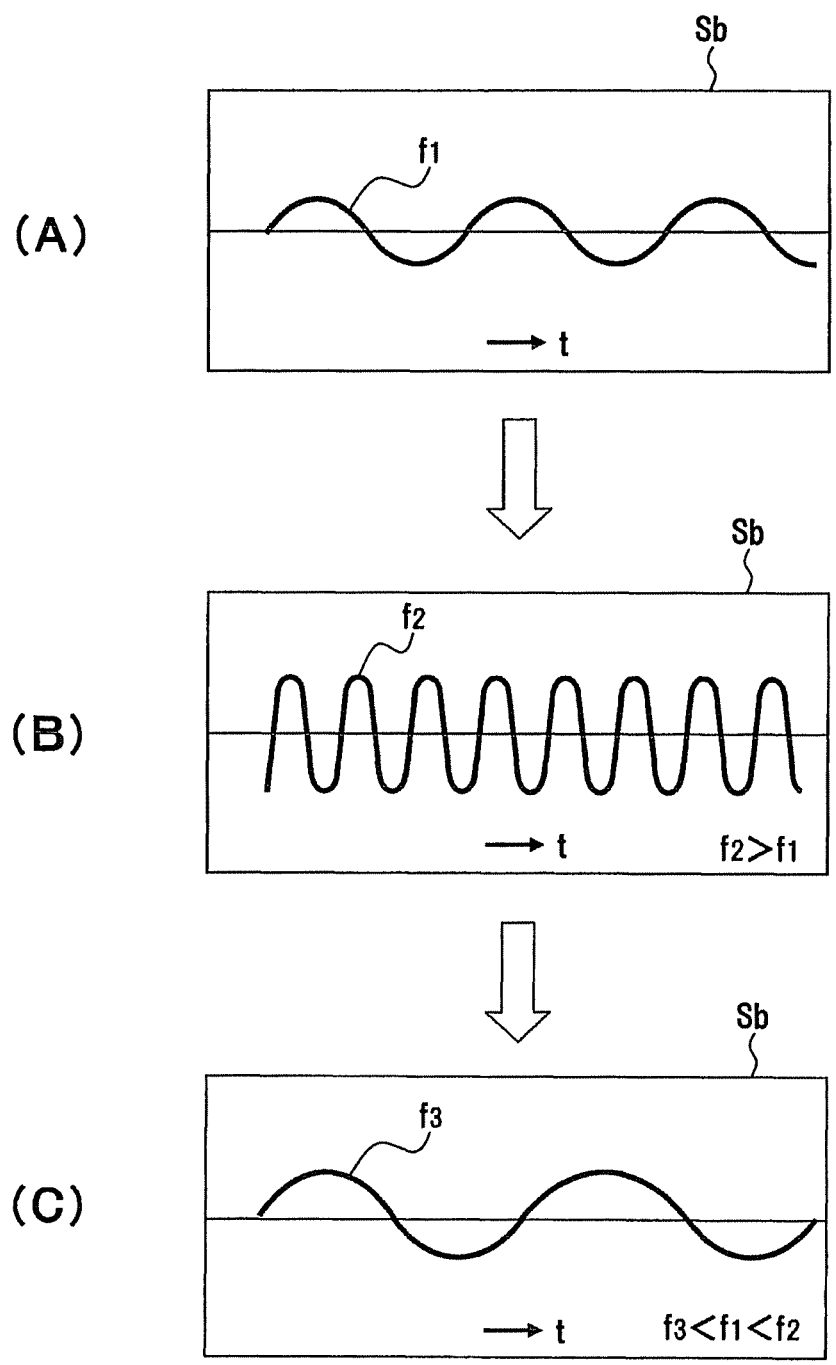
FIGS. 34A to 34C are diagrams of sound guidance.

A third embodiment will be described with reference to FIGS. 31 and 32. FIG. 31 depicts a level gauge guidance table according to the third embodiment and FIG. 32 depicts a relationship between the pulse amplitude and the level gauge. The configurations of FIGS. 31 and 32 are by way of example and the present invention is not limited to these configurations.

In this embodiment, the above described hard mode is defined as a standard mode, and a very hard mode is set as the other mode instead of the easy mode. In this case, the level gauge 74 is set for the pulse amplitude information 72 acquired by the camera device 16 as depicted in FIG. 31 in a level gauge guidance table 700, and the level gauge values $L_1$ corresponding to the standard mode and the level gauge values $L_3$ of the very hard mode are set in the level gauge 74.

If the pulse amplitude may not be acquired from an image, i.e., if amplitude=0, $L_1=L_3=0$ is set; if amplitude=1 (very small), $L_1=1$ is set while $L_3=0$ is set; if amplitude=2 (small), $L_1=2$ is set while $L_3=0$ is set; if amplitude=3 (intermediate), $L_1=L_3=3$ is set; if amplitude=4 (large), $L_1=L_3=4$ is set; and if amplitude=5 (very large), $L_1=L_3=5$ is set. In this setting of the level gauge guidance table 700, when the amplitude is increased from 0 to 5, the level gauge value of the standard mode is increased stepwise from $L_1=0$ to 5 while the level gauge value $L_3$ of the very hard mode is $L_3=0$ in the case of the amplitude=0 to 2 and is increased stepwise to $L_1=3$, 4, and 5 in the case of the amplitude=3 to 5.

In graphic representation of these relationships, the level gauge value $L_1$ is represented by a linear function with the level uniformly increased relative to the pulse amplitude M while the level gauge value $L_3$ is set to the level gauge value $L_3=0$ for the pulse amplitude M=1 and 2 and is increased in the same way as the level gauge value $L_1$ for the pulse amplitude M=3 to 5 as depicted in FIG. 32.

If such a standard mode (hard mode) and a very hard mode is used and, for example, the evaluation in the very hard mode is first performed and then shifted to the standard mode, since a user corrects a finger position to the appropriate position with careful operations because of very poor initial level gauge display, a higher evaluation level may be achieved in the standard mode and a finger may be led to the appropriate position. As a result, the pulse may be measured at the appropriate position to improve the measurement accuracy.

[d] Fourth Embodiment

A fourth embodiment will be described with reference to FIGS. 33A to 34C. FIGS. 33A to 34C are diagrams of sound guidance according to the fourth embodiment. The configurations of FIGS. 33A to 34C are by way of example and the present invention is not limited to these configurations.

Although the guidance is given through the level gauge display on the display screen 80 in the first embodiment, this guidance may be given through sound and the guidance may be given through variations in the cycle of intermittent sound at a frequency f corresponding to the level gauge value (FIGS. 33A to 33C) or variations in the frequency corresponding to the level gauge value (FIGS. 34A to 34C).

In the case of the variations in the cycle of intermittent sound at the frequency f corresponding to the level gauge value, since the level gauge value $L_2=3$ is set if amplitude=1 because of the execution of the easy mode (FIG. 17), intermittent sound Sa at the constant frequency f is emitted from the speakers 44L and 44R at emission intervals set to intervals $T_1$ corresponding to the level gauge value $L_2=3$ as depicted in FIG. 33A.

When the transition of operation is made from the easy mode to the hard mode after a predetermined time T from the easy mode display, since the level gauge value $L_1=1$ is set if amplitude=1 (FIG. 17), the intermittent sound Sa is emitted from the speakers 44L and 44R at emission intervals set to intervals $T_2$ corresponding to the level gauge value $L_1=1$ as depicted in FIG. 33B. Since the sound is emitted at shorter intervals because of $T_2<T_1$, a user recognizes that the finger placement is not appropriate and is prompted to correct the finger placement.

If the user corrects the finger placement to the appropriate position based on such guidance display, as depicted in FIG. 33c, the emission intervals of the intermittent sound Sa are changed to intervals $T_3$ and the intervals $T_3$ are intervals corresponding to the level gauge value $L_1=5$. Since the shift of the intermittent sound Sa to the intervals $T_3$ causes the user to recognize that the finger placement is appropriate because of $T_3>T_1>T_2$ in this case, the accurate pulse measurement may be performed and the credible measurement results may be acquired.

In the case of the variations in the frequency corresponding to the level gauge value, since the level gauge value $L_2=3$ is set if amplitude=1 because of the execution of the easy mode (FIG. 17), continuous sound Sb is emitted from the speakers 44L and 44R with a frequency set to a frequency $f_1$ corresponding to the level gauge value $L_2=3$ as depicted in FIG. 34A.

When the transition of operation is made from the easy mode to the hard mode after a predetermined time $T_{ref}$ from the easy mode display, since the level gauge value $L_1=1$ is set if amplitude=1 (FIG. 17), the continuous sound Sb is emitted from the speakers 44L and 44R with a frequency set to a frequency $f_2$ corresponding to the level gauge value $L_1=1$ as depicted in FIG. 34B. Since the sound is emitted at a higher frequency because of $f_2>f_1$, a user recognizes that the finger placement is not appropriate and is prompted to correct the finger placement.

If the user corrects the finger placement to the appropriate position based on such guidance display, the continuous sound Sb is changed to a frequency $f_3$ and the frequency $f_3$ are frequencies corresponding to the level gauge value $L_1=5$, as depicted in FIG. 34c. Since the shift of the continuous sound Sb to the frequency $f_3$ causes the user to recognize that the finger placement is appropriate because of $f_3<f_1<f_2$ in this case, the accurate pulse measurement may be performed and the credible measurement results may be acquired.

Figure 35:
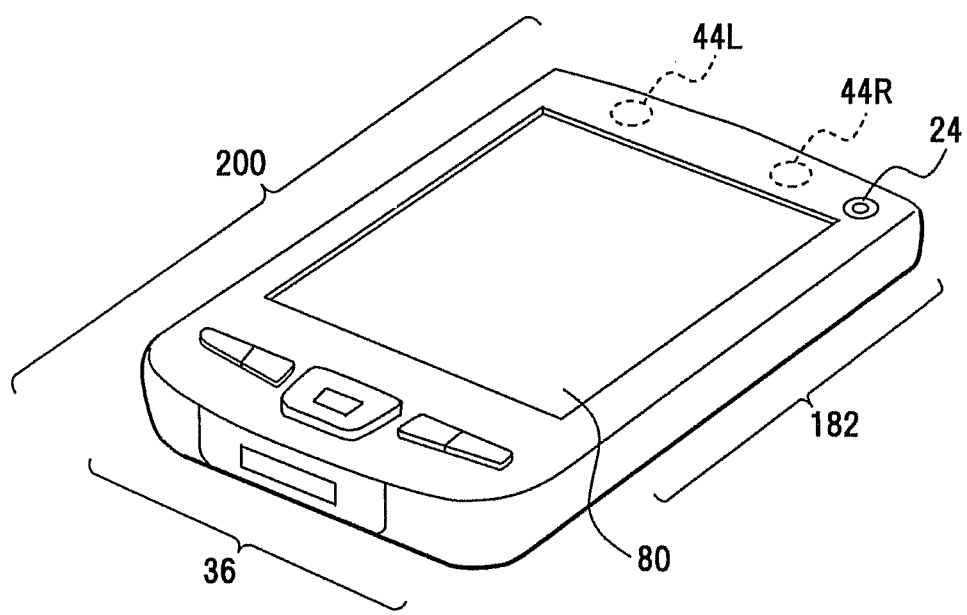
FIG. 35 is a personal digital assistance according to another embodiment.
Figure 36:
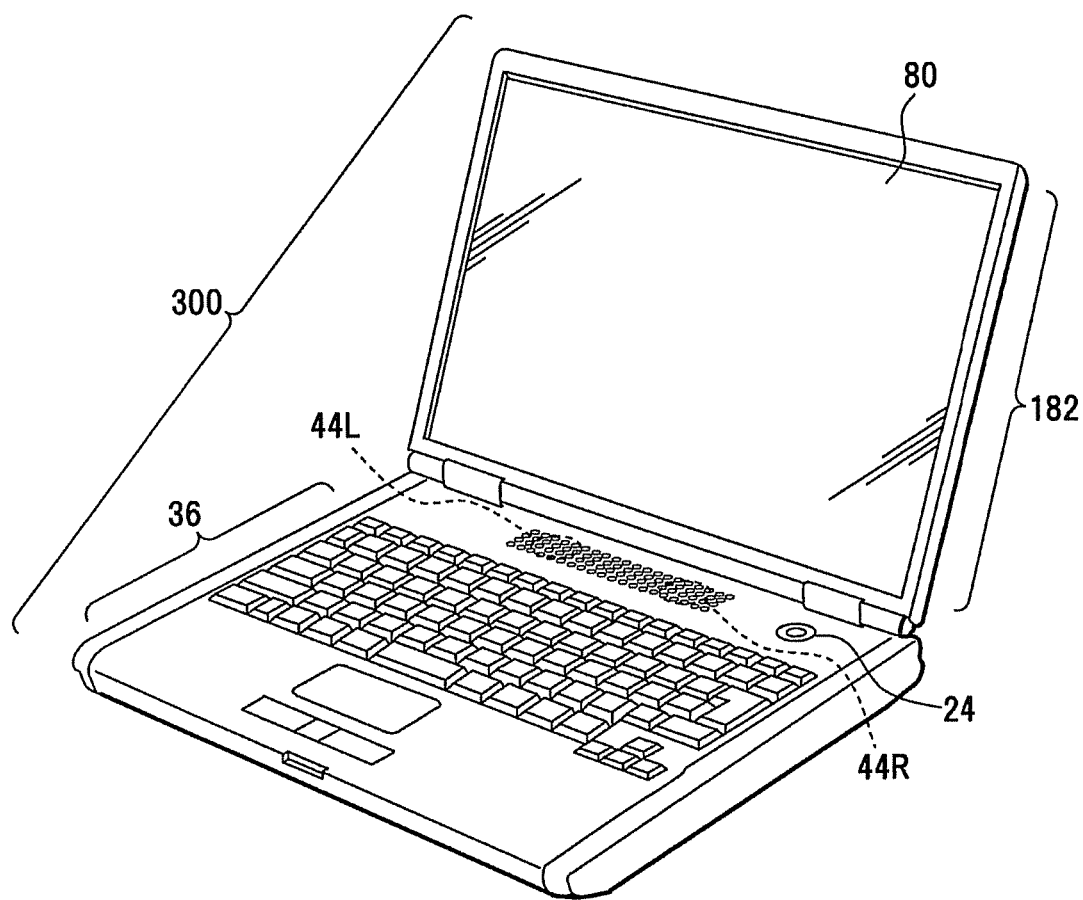
FIG. 36 is a personal computer according to another embodiment.
Figure 37:
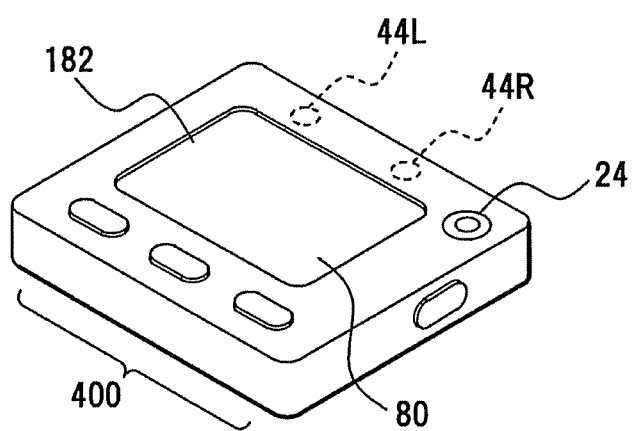
FIG. 37 is a pulse meter according to another embodiment.

[e] Other Embodiments (1) Although the portable terminal device 20 is exemplarily illustrated as a guidance apparatus, a device equipped with the guidance apparatus, and a device that measures pulses from a finger, etc., in this embodiment, the present invention is applicable to devices such as a personal digital assistant (PDA) (FIG. 35), a personal computer (PC) (FIG. 36), and a pulse meter (FIG. 37) and is not limited to the above embodiment. Portions of a PDA 200 (FIG. 35), a PC 300 (FIG. 36), and a pulse meter 400 (FIG. 37) in common with the above embodiments are given the same reference numerals and will not be described.

(2) Although the guidance method is described as guidance of the finger placement on the camera unit for pulse measurement in the above embodiments, the present invention is applied to devices related to user operations requiring a degree of learning, such as finger operations for the fingerprint authentication and palm placement at the time of the vein authentication and is not limited to the pulse measurement.

(3) Although 20 [seconds] are exemplarily illustrated as the predetermined time $T_{ref}$ of the easy-mode operation time T, the predetermined time $T_{ref}$ may be less than 20 [seconds] a time period greater than 20 [seconds], or may arbitrarily be increased or reduced.

Features and advantages of the embodiments described above will be listed as follows.

(1) The first and second evaluation modes are set with different evaluation criteria and the transition of the evaluation modes may allow a user to recognize different evaluation results and the transition thereof and may prompt the user to correct the acquired evaluation result toward higher evaluation.

(2) Since the transition of the evaluation modes may automatically be made to make the transition of the evaluation results and a user may recognize the transition if the evaluation results are different and is prompted to perform correction to an appropriate state, the correction may quickly be made to an appropriate state by the user.

The present invention relates to guidance of a device having an evaluation function for evaluating information acquired from a living body such as a finger and is useful since the first and second evaluation modes are set with different evaluation criteria and the transition of the evaluation modes may allow a user to recognize different evaluation results and the transition thereof and may prompt the user to correct the acquired evaluation result toward higher evaluation to guide the user to an appropriate state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A guidance method for giving guidance through evaluation results for acquired information, comprising:
    acquiring finger image information using a camera device;
    outputting an evaluation result of the finger image information, which is acquired, or acquired information that is acquired from the finger image information before application of a first evaluation mode that is set and that evaluates the finger image information or the acquired information with a first stepwise criterion, by applying a second evaluation mode that is set and that evaluates the finger image information or the acquired information with a second criterion that is different from the first criterion;
    transitioning to the first evaluation mode after the application of the second evaluation mode, and outputting an evaluation result of the finger image information or the acquired information by applying the first evaluation mode; and
    emitting guiding sound, depending on the evaluation result by applying the first evaluation mode or the second evaluation mode, and prompting correction to acquisition of acquired information by means of the guiding sound.

2. The guidance method of claim 1, wherein
    the transition from the second evaluation mode to the first evaluation mode is made after predetermined time elapses from a start of the second evaluation mode.

3. The guidance method of claim 1, wherein
    the finger image information is image information of a finger, or the acquired information is pulse information picked up from the finger image information.

4. The guidance method of claim 1, wherein
    the second evaluation mode has a level higher or lower than an evaluation level acquired from the first criterion of the first evaluation mode.

5. A guidance apparatus giving guidance through evaluation results for acquired information, comprising:
    an information acquiring part that acquires finger image information using a camera device; and
    a control part that outputs an evaluation result by applying a second evaluation mode before application of a first evaluation mode, the first evaluation mode for evaluating acquired information of the information acquiring part with a first stepwise criterion and the second evaluation mode for evaluating the acquired information with a second criterion different from the first evaluation mode being set, and that outputs an evaluation result of the first evaluation mode by making transition to the first evaluation mode from the application of the second evaluation mode.

6. A computer readable recording medium having stored thereon a guidance program operable to drive a computer to execute a process of giving guidance through evaluation results for acquired information, the program comprising:
    outputting an evaluation result by applying a second evaluation mode before application of a first evaluation mode, the first evaluation mode for evaluating the acquired information with a first stepwise criterion and the second evaluation mode for evaluating the acquired information with a second criterion different from the first evaluation mode being set; and
    outputting an evaluation result by making transition to the first evaluation mode from the application of the second evaluation mode, wherein the acquired information comprises finger image information acquired using a camera device.

7. A device having guidance function giving guidance through evaluation results for acquired information, comprising:
    an information acquiring part that acquires finger image information using a camera device; and
    a control part that outputs an evaluation result by applying a second evaluation mode before application of a first evaluation mode, the first evaluation mode for evaluating acquired information of the information acquiring part with a first stepwise criterion and the second evaluation mode for evaluating the acquired information with a second criterion different from the first evaluation mode being set, and that outputs an evaluation result of the first evaluation mode by making transition to the first evaluation mode from the application of the second evaluation mode.

8. The device of claim 7, wherein
    the transition from the second evaluation mode to the first evaluation mode are made after predetermined time elapses from a start of the second evaluation mode.

9. The device of claim 7, wherein
    the acquired information is image information acquired from a finger or pulse information picked up from the image information.

10. The device of claim 7, wherein
    the information acquiring part is an image taking part.

11. The device of claim 7, wherein
    the second evaluation mode has a level higher or lower than the evaluation level acquired from the first criterion of the first evaluation mode.

12. The device of claim 7, wherein
    the acquired information is image information representative of either or both a press and a position of a finger, or pulse information extracted from the image information.

13. The device of claim 7, comprising an output part that prompts correction by means of guiding sound, guiding display, intermittent sound with different emission intervals, or continuous sound with different frequencies depending on the evaluation result by the first evaluation mode or the second evaluation mode.

14. The guidance method of claim 1, wherein
    the finger image information is image information of a finger, and
    the correction is promoted to finger placement or finger pressure.

* * * * *

UNITED STATES PATENT AND TRADEMARK OFFICE
CERTIFICATE OF CORRECTION

| | |
|---|---|
| PATENT NO. | : 8,905,941 B2 |
| APPLICATION NO. | : 12/390723 |
| DATED | : December 9, 2014 |
| INVENTOR(S) | : Koichiro Kasama |

Page 1 of 1

It is certified that error appears in the above-identified patent and that said Letters Patent is hereby corrected as shown below:

In the Claims

Column 20, line 63, in Claim 14, delete "promoted" and insert -- prompted --, therefor.

Signed and Sealed this
Nineteenth Day of May, 2015

Michelle K. Lee
*Director of the United States Patent and Trademark Office*